US008903577B2

(12) United States Patent
Jalbout et al.

(10) Patent No.: US 8,903,577 B2
(45) Date of Patent: Dec. 2, 2014

(54) TRACTION SYSTEM FOR ELECTRICALLY POWERED VEHICLES

(75) Inventors: Bassam D. Jalbout, Quebec (CA); Brian Wong, Kirkland (CA)

(73) Assignee: LSI Industries, Inc., Cincinnati, OH (US)

( * ) Notice: Subject to any disclaimer, the term of this patent is extended or adjusted under 35 U.S.C. 154(b) by 739 days.

(21) Appl. No.: 12/609,545

(22) Filed: Oct. 30, 2009

(65) Prior Publication Data
US 2011/0106350 A1 May 5, 2011

(51) Int. Cl.
| B60L 11/00 | (2006.01) |
| B60W 10/04 | (2006.01) |
| B60K 28/16 | (2006.01) |
| B60L 15/08 | (2006.01) |
| B60L 15/20 | (2006.01) |

(52) U.S. Cl.
CPC ............ *B60K 28/16* (2013.01); *Y02T 10/7283* (2013.01); *Y02T 10/646* (2013.01); *Y02T 10/648* (2013.01); *B60L 15/08* (2013.01); *B60L 15/2045* (2013.01)
USPC ........................................ 701/22; 180/65.285

(58) Field of Classification Search
USPC .................. 701/22, 82, 89; 180/65.1, 65.275, 180/65.285; 318/1, 101, 98, 606
See application file for complete search history.

(56) References Cited

U.S. PATENT DOCUMENTS

| 4,090,189 A | 5/1978 | Fisler |
| 4,163,969 A | 8/1979 | Enemark |
| 4,284,884 A | 8/1981 | Dyment et al. |
| 4,388,558 A | 6/1983 | Mizuno et al. |
| 4,572,996 A | 2/1986 | Hanschke et al. |
| 4,574,225 A | 3/1986 | Pershall et al. |
| 4,574,686 A | 3/1986 | Budzich |
| 4,577,240 A | 3/1986 | Hedberg et al. |
| 4,583,027 A | 4/1986 | Parker et al. |

(Continued)

FOREIGN PATENT DOCUMENTS

| CN | 1593972 | 3/2005 |
| CN | 101081601 | 12/2007 |

(Continued)

OTHER PUBLICATIONS

Fahimi et al., A Switched Reluctance Machine-Based Starter/Alternator for More Electric Cars, Mar. 2004.*

(Continued)

*Primary Examiner* — Joshua Rodden
(74) *Attorney, Agent, or Firm* — McDermott Will & Emery LLP

(57) ABSTRACT

Fixed frequency, fixed duration pulse streams are used to control power switches for one or more electrical motors of electrically powered vehicles or hybrid vehicles having one or more electric motors. The advantages of a pulse system are increased power efficiency and system simplicity over analog systems. The capability of system calibration with a single pulse allows the system to be used under any conditions, and real time adaptation to changes in conditions. Such system and methods provide much improved acceleration over other electrical systems, by making the best use of the coefficient of starting or static friction. The systems and methods provide a non slip traction control system, and the use of an off state in the pulse stream is superior to the use of braking systems for the same purpose, which waste power and cause mechanical wear. In addition, related computer program products are described.

61 Claims, 6 Drawing Sheets

(56) References Cited

U.S. PATENT DOCUMENTS

| | | |
|---|---|---|
| 4,583,365 A | 4/1986 | John et al. |
| 4,584,511 A | 4/1986 | Rudich, Jr. et al. |
| 4,585,280 A | 4/1986 | Leiber |
| 4,589,520 A | 5/1986 | Tapfer |
| 4,590,563 A | 5/1986 | Matsumura et al. |
| 4,591,769 A | 5/1986 | Beckerman |
| 4,592,087 A | 5/1986 | Killion |
| 4,592,278 A | 6/1986 | Tokuno et al. |
| 4,594,978 A | 6/1986 | Kanno et al. |
| 4,595,433 A | 6/1986 | Ford et al. |
| 4,598,787 A | 7/1986 | Drutchas |
| 4,604,034 A | 8/1986 | Wheeldon et al. |
| 4,605,883 A | 8/1986 | Cockroft |
| 4,607,932 A | 8/1986 | Egawa et al. |
| 4,610,739 A | 9/1986 | Jensen |
| 4,611,154 A | 9/1986 | Lambropoulos |
| 4,614,901 A | 9/1986 | Kullman et al. |
| 4,617,637 A | 10/1986 | Chu et al. |
| 4,618,237 A | 10/1986 | Kitagawa |
| 4,618,761 A | 10/1986 | Inoue et al. |
| 4,622,499 A | 11/1986 | Squires et al. |
| 4,622,500 A | 11/1986 | Budelman |
| 4,623,974 A | 11/1986 | Denz et al. |
| 4,624,334 A | 11/1986 | Kelledes et al. |
| 4,626,763 A | 12/1986 | Edwards |
| 4,633,154 A | 12/1986 | Maeda |
| 4,633,156 A | 12/1986 | Besson et al. |
| 4,634,944 A | 1/1987 | Hastings et al. |
| 4,635,439 A | 1/1987 | Wible |
| 4,636,706 A | 1/1987 | Bowman et al. |
| 4,639,653 A | 1/1987 | Anderson et al. |
| 4,640,158 A | 2/1987 | Link et al. |
| 4,641,073 A | 2/1987 | Sawada |
| 4,642,441 A | 2/1987 | Kenyon |
| 4,642,537 A | 2/1987 | Young |
| 4,644,864 A | 2/1987 | Komorowski et al. |
| 4,649,287 A | 3/1987 | Nola |
| 4,651,068 A | 3/1987 | Meshkat-Razavi |
| 4,652,260 A | 3/1987 | Fenton et al. |
| 4,652,265 A | 3/1987 | McDougall |
| 4,654,566 A | 3/1987 | Erdman |
| 4,654,924 A | 4/1987 | Getz et al. |
| 4,658,742 A | 4/1987 | Tanasescu et al. |
| 4,659,974 A | 4/1987 | Bax et al. |
| 4,660,977 A | 4/1987 | Wittmer |
| 4,663,575 A | 5/1987 | Juzswik et al. |
| 4,666,020 A | 5/1987 | Watanabe |
| 4,667,137 A | 5/1987 | Macleod |
| 4,667,951 A | 5/1987 | Honjo et al. |
| 4,668,220 A | 5/1987 | Hawrylenko |
| 4,670,007 A | 6/1987 | Wheeldon et al. |
| 4,673,852 A | 6/1987 | Geiger |
| 4,675,575 A | 6/1987 | Smith et al. |
| 4,680,512 A | 7/1987 | Melocik |
| 4,684,855 A | 8/1987 | Kallos et al. |
| 4,686,436 A | 8/1987 | Archer |
| 4,686,437 A | 8/1987 | Langley et al. |
| 4,691,269 A | 9/1987 | Yamane et al. |
| 4,691,797 A | 9/1987 | Miller |
| 4,698,577 A | 10/1987 | Seymour et al. |
| 4,698,794 A | 10/1987 | Kruger et al. |
| 4,703,186 A | 10/1987 | Nakayama et al. |
| 4,705,500 A | 11/1987 | Reimels et al. |
| 4,705,997 A | 11/1987 | Juzswik |
| 4,716,409 A | 12/1987 | Hart et al. |
| 4,716,943 A | 1/1988 | Yoshida et al. |
| 4,719,361 A | 1/1988 | Brubaker |
| 4,722,021 A | 1/1988 | Hornung et al. |
| 4,724,495 A | 2/1988 | Hedberg et al. |
| 4,733,249 A | 3/1988 | Iwamoto et al. |
| 4,734,626 A | 3/1988 | Sutrina et al. |
| 4,734,861 A | 3/1988 | Bertolasi et al. |
| 4,745,900 A | 5/1988 | Thudt |
| 4,746,844 A | 5/1988 | MacKelvie et al. |
| 4,749,181 A | 6/1988 | Pittaway et al. |
| 4,749,193 A | 6/1988 | Hacker |
| 4,749,933 A | 6/1988 | Ben-Aaron |
| 4,750,837 A | 6/1988 | Gifford et al. |
| 4,751,978 A | 6/1988 | Drutchas et al. |
| 4,756,183 A | 7/1988 | Rajala et al. |
| 4,763,347 A | 8/1988 | Erdman |
| 4,770,065 A | 9/1988 | Woyton |
| 4,771,224 A | 9/1988 | Elms |
| 4,771,930 A | 9/1988 | Gillotti et al. |
| 4,774,448 A | 9/1988 | Yoshitomi |
| 4,774,914 A | 10/1988 | Ward |
| 4,774,916 A | 10/1988 | Smith |
| 4,777,382 A | 10/1988 | Reingold |
| 4,777,603 A | 10/1988 | Woodman et al. |
| 4,779,032 A | 10/1988 | Sakaegi et al. |
| 4,779,577 A | 10/1988 | Ritter et al. |
| 4,782,272 A | 11/1988 | Buckley et al. |
| 4,783,774 A | 11/1988 | Enomoto |
| 4,785,927 A | 11/1988 | Dobbins |
| 4,791,905 A | 12/1988 | Furuta et al. |
| 4,794,997 A | 1/1989 | North |
| 4,794,999 A | 1/1989 | Hester |
| 4,795,314 A | 1/1989 | Prybella et al. |
| 4,799,126 A | 1/1989 | Kruse et al. |
| 4,800,326 A | 1/1989 | Unsworth |
| 4,800,974 A | 1/1989 | Wand et al. |
| 4,802,768 A | 2/1989 | Gifford et al. |
| 4,802,777 A | 2/1989 | Yamada |
| 4,803,415 A | 2/1989 | Sepesy |
| 4,804,266 A | 2/1989 | Barshad |
| 4,805,750 A | 2/1989 | Nitz |
| 4,806,841 A | 2/1989 | Lee et al. |
| 4,807,420 A | 2/1989 | Barker |
| 4,808,895 A | 2/1989 | Fujita et al. |
| 4,808,994 A | 2/1989 | Riley |
| 4,811,901 A | 3/1989 | Stevens et al. |
| 4,812,724 A | 3/1989 | Langer et al. |
| 4,813,312 A | 3/1989 | Wilhelm |
| 4,814,674 A | 3/1989 | Harassky |
| 4,815,278 A | 3/1989 | White |
| 4,818,920 A | 4/1989 | Jacob |
| 4,820,092 A | 4/1989 | Mueller et al. |
| 4,827,196 A | 5/1989 | Odell |
| 4,837,753 A | 6/1989 | Morris et al. |
| 4,839,754 A | 6/1989 | Gami et al. |
| 4,839,814 A | 6/1989 | Steidel |
| 4,843,297 A | 6/1989 | Landino et al. |
| 4,843,533 A | 6/1989 | Roof et al. |
| 4,854,902 A | 8/1989 | Havins |
| 4,856,286 A | 8/1989 | Sulfstede et al. |
| 4,859,921 A | 8/1989 | Archer |
| 4,870,556 A | 9/1989 | Inaba et al. |
| 4,873,463 A | 10/1989 | Jones |
| 4,874,997 A | 10/1989 | Daggett et al. |
| 4,876,491 A | 10/1989 | Squires et al. |
| 4,877,956 A | 10/1989 | Priest |
| 4,879,501 A | 11/1989 | Haner |
| 4,879,623 A | 11/1989 | Baumgartner |
| 4,884,597 A | 12/1989 | Tamura et al. |
| 4,887,118 A | 12/1989 | Gaewsky et al. |
| 4,888,531 A | 12/1989 | Hormann |
| 4,888,985 A | 12/1989 | Siemer |
| 4,889,097 A | 12/1989 | Bevill et al. |
| 4,890,047 A | 12/1989 | Maney |
| 4,891,764 A | 1/1990 | McIntosh |
| 4,897,882 A | 1/1990 | Pickering |
| 4,899,338 A | 2/1990 | Wroblewski |
| 4,901,142 A | 2/1990 | Ikuno et al. |
| 4,902,039 A | 2/1990 | Kawai et al. |
| 4,903,004 A | 2/1990 | Starke et al. |
| 4,904,919 A | 2/1990 | McNaughton |
| 4,906,906 A | 3/1990 | Lautzenhiser et al. |
| 4,907,223 A | 3/1990 | Wroblewski |
| 4,908,822 A | 3/1990 | Wroblewski |
| 4,914,592 A | 4/1990 | Callahan et al. |
| 4,916,367 A | 4/1990 | Yamaguchi et al. |
| 4,920,532 A | 4/1990 | Wroblewski |
| 4,922,572 A | 5/1990 | Kohl et al. |
| 4,925,443 A | 5/1990 | Heilman et al. |

(56) References Cited

U.S. PATENT DOCUMENTS

| | | | |
|---|---|---|---|
| 4,926,037 A | 5/1990 | Martin-Lopez | |
| 4,928,050 A | 5/1990 | Torisawa et al. | |
| 4,931,715 A | 6/1990 | Lee et al. | |
| 4,935,641 A | 6/1990 | Wilhelm | |
| 4,938,474 A | 7/1990 | Sweeney et al. | |
| 4,941,325 A | 7/1990 | Nuding | |
| 4,942,529 A | 7/1990 | Avitan et al. | |
| 4,947,015 A | 8/1990 | Lach | |
| 4,952,196 A | 8/1990 | Chilcote et al. | |
| 4,954,764 A | 9/1990 | Kim | |
| 4,967,134 A | 10/1990 | Losic et al. | |
| 4,967,869 A * | 11/1990 | Nagaoka et al. | 180/244 |
| 4,969,128 A | 11/1990 | Dennis et al. | |
| 4,969,739 A | 11/1990 | McGee | |
| 4,970,958 A | 11/1990 | Lyon et al. | |
| 4,973,174 A | 11/1990 | Losic et al. | |
| 4,978,899 A | 12/1990 | Lautzenhiser et al. | |
| 4,980,620 A | 12/1990 | Losic et al. | |
| 4,981,091 A | 1/1991 | Taylor et al. | |
| 4,982,384 A | 1/1991 | Pipkin et al. | |
| 4,990,001 A | 2/1991 | Losic et al. | |
| 4,998,294 A | 3/1991 | Banks et al. | |
| 4,998,520 A | 3/1991 | Wright | |
| 5,001,375 A | 3/1991 | Jones | |
| 5,001,770 A | 3/1991 | Losic et al. | |
| 5,005,088 A | 4/1991 | Fukushima et al. | |
| 5,012,165 A | 4/1991 | Lautzenhiser et al. | |
| 5,013,998 A | 5/1991 | Varga et al. | |
| 5,015,937 A | 5/1991 | Wright et al. | |
| 5,017,854 A | 5/1991 | Gully et al. | |
| 5,020,125 A | 5/1991 | Losic et al. | |
| 5,021,726 A | 6/1991 | Reinhardt et al. | |
| 5,023,527 A | 6/1991 | Erdman et al. | |
| 5,023,531 A | 6/1991 | Altemose et al. | |
| 5,032,772 A | 7/1991 | Gully et al. | |
| 5,034,622 A | 7/1991 | Kuzmik | |
| 5,034,872 A | 7/1991 | Losic et al. | |
| 5,036,307 A | 7/1991 | Reavell et al. | |
| 5,041,070 A | 8/1991 | Blaser | |
| 5,045,172 A | 9/1991 | Guzman | |
| 5,049,046 A | 9/1991 | Escue et al. | |
| 5,050,681 A | 9/1991 | Skinner | |
| 5,059,876 A | 10/1991 | Shah et al. | |
| 5,060,151 A | 10/1991 | Mikyska et al. | |
| 5,060,454 A | 10/1991 | Benz | |
| 5,068,582 A | 11/1991 | Scott | |
| 5,070,292 A | 12/1991 | Goff | |
| 5,072,399 A | 12/1991 | Laws et al. | |
| 5,084,658 A | 1/1992 | Nielsen et al. | |
| 5,087,356 A | 2/1992 | Webb | |
| 5,089,759 A | 2/1992 | Miotke et al. | |
| 5,095,222 A | 3/1992 | Pierret et al. | |
| 5,097,494 A | 3/1992 | Pantelleria et al. | |
| 5,099,186 A | 3/1992 | Rippel et al. | |
| 5,099,368 A | 3/1992 | Okamura | |
| 5,099,654 A | 3/1992 | Baruschke et al. | |
| 5,108,322 A | 4/1992 | Henderson | |
| 5,117,165 A | 5/1992 | Cassat et al. | |
| 5,119,136 A | 6/1992 | Morikawa | |
| 5,122,719 A | 6/1992 | Bessenyei et al. | |
| 5,126,647 A | 6/1992 | Blackburn et al. | |
| 5,126,677 A | 6/1992 | Campbell et al. | |
| 5,129,317 A | 7/1992 | Gloe et al. | |
| 5,132,602 A | 7/1992 | Jorgensen et al. | |
| 5,140,248 A | 8/1992 | Rowan et al. | |
| 5,142,468 A | 8/1992 | Nerem | |
| 5,142,861 A | 9/1992 | Schlicher et al. | |
| 5,151,017 A | 9/1992 | Sears et al. | |
| 5,151,641 A | 9/1992 | Shamoto | |
| 5,155,419 A | 10/1992 | Naito | |
| 5,156,005 A | 10/1992 | Redlich | |
| 5,159,218 A | 10/1992 | Murry et al. | |
| 5,159,370 A | 10/1992 | Takahashi | |
| 5,160,925 A | 11/1992 | Dailey et al. | |
| 5,161,073 A | 11/1992 | Gami et al. | |
| 5,170,108 A | 12/1992 | Peterson et al. | |
| 5,171,173 A | 12/1992 | Henderson et al. | |
| 5,180,023 A | 1/1993 | Reimers | |
| 5,181,616 A | 1/1993 | Gigan | |
| 5,184,114 A | 2/1993 | Brown | |
| 5,185,071 A | 2/1993 | Serwer et al. | |
| 5,189,246 A | 2/1993 | Marsh et al. | |
| 5,194,797 A | 3/1993 | Kahkipuro | |
| 5,200,697 A * | 4/1993 | Adler et al. | 324/174 |
| 5,200,944 A | 4/1993 | Souma | |
| 5,202,951 A | 4/1993 | Doyle | |
| 5,205,636 A | 4/1993 | Carpenter | |
| 5,206,698 A | 4/1993 | Werner et al. | |
| 5,231,747 A | 8/1993 | Clark et al. | |
| 5,232,052 A | 8/1993 | Arvidson et al. | |
| 5,234,050 A | 8/1993 | Weigert | |
| 5,234,066 A | 8/1993 | Ahsing et al. | |
| 5,241,257 A | 8/1993 | Nordby et al. | |
| 5,246,479 A | 9/1993 | Gami et al. | |
| 5,247,231 A | 9/1993 | Glucina | |
| 5,249,046 A | 9/1993 | Ulich et al. | |
| RE34,399 E | 10/1993 | Gami et al. | |
| 5,252,905 A | 10/1993 | Wills et al. | |
| 5,254,936 A | 10/1993 | Leaf et al. | |
| 5,260,811 A | 11/1993 | Morikawa | |
| 5,270,624 A | 12/1993 | Lautzenhiser | |
| 5,270,631 A | 12/1993 | Takahashi et al. | |
| 5,274,287 A | 12/1993 | Bahn | |
| 5,278,481 A | 1/1994 | Danbury | |
| 5,281,919 A | 1/1994 | Palanisamy | |
| 5,281,956 A | 1/1994 | Bashark | |
| 5,282,181 A | 1/1994 | Entner et al. | |
| 5,282,641 A | 2/1994 | McLaughlin | |
| 5,287,051 A | 2/1994 | Konrad et al. | |
| 5,293,906 A | 3/1994 | Amin | |
| 5,294,853 A | 3/1994 | Schluter et al. | |
| 5,297,394 A | 3/1994 | Frohbieter et al. | |
| 5,302,945 A | 4/1994 | Stoltenberg | |
| 5,304,910 A | 4/1994 | Loncle et al. | |
| 5,304,911 A | 4/1994 | Anderson | |
| 5,306,990 A | 4/1994 | Hofsass et al. | |
| 5,314,402 A | 5/1994 | Foote et al. | |
| 5,315,218 A | 5/1994 | Fortune et al. | |
| 5,315,442 A | 5/1994 | Sato et al. | |
| 5,317,307 A | 5/1994 | Thomas, Jr. | |
| 5,317,668 A | 5/1994 | Kobayashi | |
| 5,319,352 A | 6/1994 | Robertson et al. | |
| 5,321,231 A | 6/1994 | Schmalzriedt et al. | |
| 5,323,483 A | 6/1994 | Baeg | |
| 5,325,031 A | 6/1994 | Tilden | |
| 5,330,342 A | 7/1994 | Linss et al. | |
| 5,331,258 A | 7/1994 | Lankin et al. | |
| 5,331,539 A | 7/1994 | Pfeifer et al. | |
| 5,332,954 A | 7/1994 | Lankin | |
| 5,333,655 A | 8/1994 | Bergamini et al. | |
| 5,340,295 A | 8/1994 | Preiato et al. | |
| 5,359,272 A | 10/1994 | Liao | |
| 5,369,991 A | 12/1994 | Armstrong | |
| 5,370,112 A | 12/1994 | Perkins | |
| 5,373,436 A | 12/1994 | Yamaguchi et al. | |
| 5,376,866 A | 12/1994 | Erdman | |
| 5,389,864 A | 2/1995 | Tryan et al. | |
| 5,396,306 A | 3/1995 | Kawasaki et al. | |
| 5,396,443 A | 3/1995 | Mese et al. | |
| 5,402,155 A | 3/1995 | Hatayama et al. | |
| 5,404,085 A | 4/1995 | Resch et al. | |
| 5,406,126 A | 4/1995 | Hadley et al. | |
| 5,406,186 A | 4/1995 | Fair | |
| 5,422,014 A | 6/1995 | Allen et al. | |
| 5,425,005 A | 6/1995 | Urabe et al. | |
| 5,430,362 A | 7/1995 | Carr et al. | |
| 5,437,608 A | 8/1995 | Cutler | |
| 5,437,634 A | 8/1995 | Amano | |
| 5,442,276 A | 8/1995 | Schwartz et al. | |
| 5,447,051 A | 9/1995 | Hanks et al. | |
| 5,447,062 A | 9/1995 | Kopl et al. | |
| 5,448,035 A | 9/1995 | Thutt et al. | |
| 5,450,156 A | 9/1995 | Kawasaki et al. | |
| 5,450,521 A | 9/1995 | Redlich et al. | |

(56) References Cited

U.S. PATENT DOCUMENTS

| | | |
|---|---|---|
| 5,451,851 A | 9/1995 | Allen et al. |
| 5,459,379 A | 10/1995 | Takeda et al. |
| 5,461,881 A | 10/1995 | Handel et al. |
| 5,461,908 A | 10/1995 | Armstrong |
| 5,462,504 A | 10/1995 | Trulaske et al. |
| 5,466,209 A | 11/1995 | Takegawa et al. |
| 5,481,176 A | 1/1996 | DeBiasi et al. |
| 5,482,361 A | 1/1996 | Burchhardt et al. |
| 5,485,140 A | 1/1996 | Bussin |
| 5,486,748 A | 1/1996 | Konrad et al. |
| 5,487,290 A | 1/1996 | Miller et al. |
| 5,488,283 A | 1/1996 | Dougherty et al. |
| 5,489,771 A | 2/1996 | Beach et al. |
| 5,489,831 A | 2/1996 | Harris |
| 5,493,642 A | 2/1996 | Dunsmuir et al. |
| 5,494,112 A | 2/1996 | Arvidson et al. |
| 5,497,064 A | 3/1996 | Van Sistine |
| 5,500,578 A | 3/1996 | Kawamura et al. |
| 5,502,957 A | 4/1996 | Robertson |
| 5,503,059 A | 4/1996 | Pacholok |
| 5,506,487 A | 4/1996 | Young et al. |
| 5,506,775 A | 4/1996 | Tsurushima et al. |
| 5,512,811 A | 4/1996 | Latos et al. |
| 5,513,058 A | 4/1996 | Hollenbeck |
| 5,517,067 A | 5/1996 | Sata |
| 5,519,496 A | 5/1996 | Borgert et al. |
| 5,521,891 A | 5/1996 | Nakane |
| 5,524,461 A | 6/1996 | Nielsen et al. |
| 5,526,460 A | 6/1996 | DeFrancesco et al. |
| 5,530,326 A | 6/1996 | Galvin et al. |
| 5,542,921 A | 8/1996 | Meyers et al. |
| RE35,362 E | 10/1996 | Arvidson et al. |
| 5,563,481 A | 10/1996 | Krause |
| 5,563,486 A | 10/1996 | Yamamoto et al. |
| 5,563,790 A | 10/1996 | Wada et al. |
| 5,569,910 A | 10/1996 | Griesemer |
| 5,569,990 A | 10/1996 | Dunfield |
| 5,575,761 A | 11/1996 | Hajianpour |
| 5,581,254 A | 12/1996 | Rundel |
| 5,582,013 A | 12/1996 | Neufeld |
| 5,583,404 A | 12/1996 | Karwath et al. |
| 5,583,411 A | 12/1996 | Kusano et al. |
| 5,585,702 A | 12/1996 | Jackson et al. |
| 5,585,708 A | 12/1996 | Richardson et al. |
| 5,585,709 A | 12/1996 | Jansen et al. |
| RE35,428 E | 1/1997 | Wilhelm |
| RE35,469 E | 3/1997 | Ueki |
| 5,610,491 A | 3/1997 | Gotz et al. |
| 5,616,994 A | 4/1997 | Nagaoka et al. |
| 5,616,997 A | 4/1997 | Jackson et al. |
| 5,617,016 A | 4/1997 | Borghi et al. |
| 5,623,334 A | 4/1997 | Cho et al. |
| 5,630,398 A | 5/1997 | Gant et al. |
| 5,633,792 A | 5/1997 | Massey |
| 5,637,971 A | 6/1997 | Pratt |
| 5,637,975 A | 6/1997 | Pummer et al. |
| 5,642,270 A | 6/1997 | Green et al. |
| 5,644,302 A | 7/1997 | Hana et al. |
| 5,652,485 A | 7/1997 | Spiegel et al. |
| 5,652,928 A | 7/1997 | Baxter et al. |
| 5,653,135 A | 8/1997 | Miller et al. |
| 5,655,380 A | 8/1997 | Calton |
| 5,669,470 A | 9/1997 | Ross |
| 5,670,858 A | 9/1997 | Heath |
| 5,670,859 A | 9/1997 | North et al. |
| 5,673,028 A | 9/1997 | Levy |
| 5,674,019 A | 10/1997 | Munakata |
| 5,676,475 A | 10/1997 | Dull |
| 5,678,982 A | 10/1997 | Schwaiger |
| 5,682,144 A | 10/1997 | Mannik |
| 5,689,170 A | 11/1997 | Ishikawa |
| 5,691,898 A | 11/1997 | Rosenberg et al. |
| 5,694,020 A | 12/1997 | Lang et al. |
| 5,704,935 A | 1/1998 | Pahl et al. |
| 5,708,312 A | 1/1998 | Rosen et al. |
| 5,709,350 A | 1/1998 | Davis et al. |
| 5,714,855 A | 2/1998 | Domel et al. |
| 5,714,862 A | 2/1998 | Mikesell et al. |
| 5,720,194 A | 2/1998 | Miller et al. |
| 5,723,963 A | 3/1998 | Li et al. |
| 5,727,372 A | 3/1998 | Kanitz et al. |
| 5,729,103 A | 3/1998 | Domel et al. |
| 5,729,110 A | 3/1998 | Steeby et al. |
| 5,739,664 A | 4/1998 | Deng et al. |
| 5,740,783 A | 4/1998 | Learman et al. |
| 5,743,227 A | 4/1998 | Jacquet et al. |
| 5,747,971 A | 5/1998 | Rozman et al. |
| 5,752,385 A | 5/1998 | Nelson |
| 5,764,244 A | 6/1998 | Bruhn et al. |
| 5,774,626 A | 6/1998 | Shenk |
| 5,780,983 A | 7/1998 | Shinkawa et al. |
| 5,780,990 A | 7/1998 | Weber |
| 5,780,997 A | 7/1998 | Sutrina et al. |
| 5,784,541 A | 7/1998 | Ruff |
| 5,789,883 A | 8/1998 | Gilman |
| 5,798,623 A | 8/1998 | El-Sadi |
| 5,801,509 A | 9/1998 | Sawa et al. |
| 5,802,844 A | 9/1998 | Lee et al. |
| 5,804,133 A | 9/1998 | Denton |
| 5,804,948 A | 9/1998 | Foust |
| 5,804,999 A | 9/1998 | DeBoer et al. |
| 5,811,946 A | 9/1998 | Mullin et al. |
| 5,811,947 A | 9/1998 | Hurst et al. |
| 5,818,183 A | 10/1998 | Lambert et al. |
| 5,818,247 A | 10/1998 | Pyun |
| 5,821,635 A | 10/1998 | Kern |
| 5,821,658 A | 10/1998 | Boggs |
| 5,823,104 A | 10/1998 | Beisel et al. |
| 5,832,558 A | 11/1998 | Ehret et al. |
| 5,838,127 A | 11/1998 | Young et al. |
| 5,841,252 A | 11/1998 | Dunfield |
| 5,841,464 A | 11/1998 | Phillips |
| 5,845,991 A | 12/1998 | Sundquist |
| 5,847,526 A | 12/1998 | Lasko et al. |
| 5,848,634 A | 12/1998 | Will et al. |
| 5,852,355 A | 12/1998 | Turner |
| 5,856,731 A | 1/1999 | Rottmerhusen |
| 5,857,061 A | 1/1999 | Chang et al. |
| 5,867,393 A | 2/1999 | Richardson et al. |
| 5,868,175 A | 2/1999 | Duff et al. |
| 5,869,946 A | 2/1999 | Carobolante |
| 5,872,474 A | 2/1999 | Kagomiya et al. |
| 5,874,818 A | 2/1999 | Schuurman |
| 5,874,819 A | 2/1999 | Hormann |
| 5,877,798 A | 3/1999 | Clarke et al. |
| 5,883,516 A | 3/1999 | Van Steenwyk et al. |
| 5,883,987 A | 3/1999 | Ogoshi et al. |
| 5,886,504 A | 3/1999 | Scott et al. |
| 5,887,302 A | 3/1999 | DiMucci et al. |
| 5,892,672 A | 4/1999 | Preller |
| 5,893,425 A | 4/1999 | Finkle |
| 5,893,891 A | 4/1999 | Zahedi |
| 5,898,649 A | 4/1999 | Park |
| 5,905,347 A | 5/1999 | Kocis |
| 5,907,227 A | 5/1999 | Domel et al. |
| 5,908,286 A | 6/1999 | Clemmons |
| 5,914,578 A | 6/1999 | Rakov |
| 5,923,110 A | 7/1999 | Zhao et al. |
| 5,936,371 A | 8/1999 | Bolash et al. |
| 5,939,849 A | 8/1999 | Ushikoshi |
| 5,943,223 A | 8/1999 | Pond |
| 5,950,364 A | 9/1999 | Hormann |
| 5,953,681 A | 9/1999 | Cantatore et al. |
| 5,966,000 A | 10/1999 | Yang |
| 5,970,937 A | 10/1999 | Casellato et al. |
| 5,971,090 A | 10/1999 | Tanaka et al. |
| 5,971,713 A | 10/1999 | North |
| 5,982,118 A | 11/1999 | Gotou et al. |
| 5,986,539 A | 11/1999 | Johansson et al. |
| 5,990,646 A | 11/1999 | Kovach et al. |
| 5,993,354 A | 11/1999 | Winks |
| 5,998,946 A | 12/1999 | Kim |
| 6,002,226 A | 12/1999 | Collier-Hallman |
| 6,002,488 A | 12/1999 | Berg et al. |

(56) References Cited

U.S. PATENT DOCUMENTS

| | | | |
|---|---|---|---|
| 6,005,366 A | 12/1999 | Majumdar et al. |
| 6,008,599 A | 12/1999 | Beck |
| 6,016,038 A | 1/2000 | Mueller et al. |
| 6,016,288 A | 1/2000 | Frith |
| 6,018,200 A | 1/2000 | Anderson et al. |
| 6,018,537 A | 1/2000 | Hofmann et al. |
| RE36,568 E | 2/2000 | Horst |
| 6,020,712 A | 2/2000 | Roesel et al. |
| 6,021,097 A | 2/2000 | Kanno et al. |
| 6,023,135 A | 2/2000 | Gilbreth et al. |
| 6,027,515 A | 2/2000 | Cimino |
| 6,028,406 A | 2/2000 | Birk |
| 6,032,415 A | 3/2000 | Tajima |
| 6,034,978 A | 3/2000 | Ujazdowski et al. |
| 6,038,918 A | 3/2000 | Newton |
| 6,039,137 A | 3/2000 | Schless |
| 6,049,197 A | 4/2000 | Caamano |
| 6,054,823 A | 4/2000 | Collings et al. |
| 6,057,658 A | 5/2000 | Kovach et al. |
| 6,058,032 A | 5/2000 | Yamanaka et al. |
| 6,060,852 A | 5/2000 | Domel et al. |
| 6,069,465 A | 5/2000 | Boois et al. |
| 6,072,752 A | 6/2000 | Igarashi et al. |
| 6,075,338 A | 6/2000 | Mazza et al. |
| 6,075,688 A | 6/2000 | Willard et al. |
| 6,078,156 A | 6/2000 | Spurr |
| 6,088,243 A | 7/2000 | Shin |
| 6,088,246 A | 7/2000 | Okuyama et al. |
| 6,091,887 A | 7/2000 | Dieterle et al. |
| 6,094,023 A | 7/2000 | Ericsson |
| 6,098,000 A | 8/2000 | Long et al. |
| 6,100,603 A | 8/2000 | Gold |
| 6,100,655 A | 8/2000 | McIntosh |
| 6,118,186 A | 9/2000 | Scott et al. |
| 6,118,238 A | 9/2000 | Munro et al. |
| 6,118,243 A | 9/2000 | Reed et al. |
| 6,121,744 A | 9/2000 | Hoda et al. |
| 6,123,312 A | 9/2000 | Dai |
| 6,128,323 A | 10/2000 | Myers et al. |
| 6,128,436 A | 10/2000 | Bos et al. |
| 6,148,784 A | 11/2000 | Masberg et al. |
| 6,150,771 A | 11/2000 | Perry |
| 6,150,774 A | 11/2000 | Mueller et al. |
| 6,150,789 A | 11/2000 | Pulford et al. |
| 6,157,661 A | 12/2000 | Walker et al. |
| 6,158,405 A | 12/2000 | Masberg et al. |
| 6,163,122 A | 12/2000 | Filippis |
| 6,163,275 A | 12/2000 | Hartzell |
| 6,164,258 A | 12/2000 | Petrovich et al. |
| 6,164,788 A | 12/2000 | Gemmell et al. |
| 6,175,204 B1 | 1/2001 | Calamatas |
| 6,178,992 B1 | 1/2001 | Van Der Paal |
| 6,179,105 B1 | 1/2001 | Haass |
| 6,181,089 B1 | 1/2001 | Kovach et al. |
| 6,188,187 B1 | 2/2001 | Harlan |
| 6,191,542 B1 | 2/2001 | Chliwnyj |
| 6,194,851 B1 | 2/2001 | Denault et al. |
| 6,194,862 B1 | 2/2001 | Hara |
| 6,194,877 B1 | 2/2001 | Judge et al. |
| 6,198,242 B1 | 3/2001 | Yokomori et al. |
| 6,198,970 B1 | 3/2001 | Freed et al. |
| 6,204,479 B1 | 3/2001 | Sickels |
| 6,204,621 B1 | 3/2001 | Gotou |
| 6,206,482 B1 | 3/2001 | Campau et al. |
| 6,208,931 B1 | 3/2001 | Schoettle et al. |
| 6,211,626 B1 | 4/2001 | Lys et al. |
| 6,222,172 B1 | 4/2001 | Fossum et al. |
| 6,222,332 B1 | 4/2001 | Fletcher et al. |
| 6,227,807 B1 | 5/2001 | Chase |
| 6,230,078 B1 | 5/2001 | Ruff |
| 6,237,461 B1 | 5/2001 | Poole |
| 6,242,889 B1 | 6/2001 | Belyo |
| 6,242,938 B1 | 6/2001 | Kessler |
| 6,243,635 B1 | 6/2001 | Swan et al. |
| 6,246,192 B1 | 6/2001 | Haass |
| 6,246,207 B1 | 6/2001 | VanSistine et al. |
| 6,259,225 B1 | 7/2001 | Matsumoto |
| 6,262,557 B1 | 7/2001 | Gotou et al. |
| 6,263,267 B1 * | 7/2001 | Anthony et al. ............... 701/22 |
| 6,269,297 B1 * | 7/2001 | Hosomi et al. ................. 701/82 |
| 6,269,844 B1 | 8/2001 | Zenoni et al. |
| 6,272,073 B1 | 8/2001 | Doucette et al. |
| 6,278,220 B1 | 8/2001 | Furukoshi et al. |
| 6,279,541 B1 | 8/2001 | Doane et al. |
| 6,286,609 B1 | 9/2001 | Carrier et al. |
| 6,291,911 B1 | 9/2001 | Dunk et al. |
| 6,295,487 B1 * | 9/2001 | Ono et al. ....................... 701/22 |
| 6,305,419 B1 | 10/2001 | Krieger et al. |
| 6,305,818 B1 | 10/2001 | Lebens et al. |
| 6,308,052 B1 | 10/2001 | Jamali et al. |
| 6,309,268 B1 | 10/2001 | Mabru |
| 6,314,003 B2 | 11/2001 | Preller |
| 6,323,625 B1 | 11/2001 | Bhargava |
| 6,325,142 B1 | 12/2001 | Bosley et al. |
| 6,326,713 B1 | 12/2001 | Judson et al. |
| 6,328,245 B1 | 12/2001 | Kastfelt et al. |
| 6,330,260 B1 | 12/2001 | Onkels et al. |
| 6,330,261 B1 | 12/2001 | Ishihara et al. |
| 6,335,511 B1 | 1/2002 | Rothermel |
| 6,339,306 B1 | 1/2002 | Hara |
| 6,340,868 B1 | 1/2002 | Lys et al. |
| 6,348,775 B1 | 2/2002 | Edelson et al. |
| 6,353,299 B1 | 3/2002 | Ramachandran et al. |
| 6,355,987 B1 | 3/2002 | Bixel |
| 6,362,586 B1 | 3/2002 | Naidu |
| 6,364,726 B1 | 4/2002 | Motose et al. |
| 6,366,049 B1 | 4/2002 | Chen et al. |
| 6,367,180 B2 | 4/2002 | Weiss et al. |
| 6,370,174 B1 | 4/2002 | Onkels et al. |
| 6,375,630 B1 | 4/2002 | Cutler et al. |
| 6,379,025 B1 | 4/2002 | Mateescu et al. |
| 6,388,419 B1 | 5/2002 | Chen et al. |
| 6,393,212 B1 | 5/2002 | Hutchinson |
| 6,396,042 B1 | 5/2002 | Boardman et al. |
| 6,397,735 B1 | 6/2002 | Wong |
| 6,400,116 B1 | 6/2002 | Chen et al. |
| 6,402,042 B1 | 6/2002 | Stenzel et al. |
| 6,404,153 B2 | 6/2002 | Gotou |
| 6,409,672 B2 | 6/2002 | Webler et al. |
| 6,410,992 B1 | 6/2002 | Wall et al. |
| 6,411,040 B1 | 6/2002 | Ertl et al. |
| 6,412,293 B1 | 7/2002 | Pham et al. |
| 6,417,814 B1 | 7/2002 | Hupka et al. |
| 6,418,581 B1 | 7/2002 | Bruce et al. |
| 6,419,014 B1 | 7/2002 | Meek et al. |
| 6,424,106 B2 | 7/2002 | Gotou et al. |
| 6,426,601 B1 | 7/2002 | De Filippis et al. |
| 6,429,627 B1 | 8/2002 | Koss et al. |
| 6,429,936 B1 | 8/2002 | Scaduto |
| 6,435,925 B1 | 8/2002 | Mabru |
| 6,438,505 B1 | 8/2002 | Pouvreau |
| 6,442,181 B1 | 8/2002 | Oliver et al. |
| 6,448,676 B1 | 9/2002 | Kershaw et al. |
| 6,448,724 B1 | 9/2002 | Kleinau et al. |
| 6,449,870 B1 | 9/2002 | Perez et al. |
| 6,453,199 B1 | 9/2002 | Kobozev |
| 6,459,222 B1 | 10/2002 | Chen |
| 6,462,506 B2 | 10/2002 | Cochoy et al. |
| 6,467,557 B1 | 10/2002 | Krueger et al. |
| 6,477,193 B2 | 11/2002 | Oliver et al. |
| 6,479,957 B1 | 11/2002 | Erdman et al. |
| 6,482,064 B1 | 11/2002 | Lund |
| 6,486,639 B1 | 11/2002 | Montret et al. |
| 6,486,643 B2 | 11/2002 | Liu |
| 6,488,390 B1 | 12/2002 | Lebens et al. |
| 6,495,938 B2 | 12/2002 | Naito et al. |
| 6,495,986 B2 | 12/2002 | Schwesig |
| 6,495,996 B1 | 12/2002 | Redlich |
| 6,496,344 B1 | 12/2002 | Hog |
| 6,497,267 B1 | 12/2002 | Azar et al. |
| 6,504,330 B2 | 1/2003 | Fletcher |
| 6,504,334 B2 | 1/2003 | Sogawa |
| 6,510,995 B2 | 1/2003 | Muthu et al. |
| 6,512,199 B1 | 1/2003 | Blazina |

(56) References Cited

U.S. PATENT DOCUMENTS

| | | |
|---|---|---|
| 6,515,443 B2 | 2/2003 | Kelly et al. |
| 6,515,584 B2 | 2/2003 | DeYoung |
| 6,525,507 B2 | 2/2003 | Ganz |
| 6,531,839 B1 | 3/2003 | Shin et al. |
| 6,533,054 B1 | 3/2003 | Fey |
| 6,537,229 B1 | 3/2003 | Wang |
| 6,538,400 B2 | 3/2003 | Fowler et al. |
| 6,538,403 B2 | 3/2003 | Gorti et al. |
| 6,538,412 B1 | 3/2003 | Klose et al. |
| RE38,054 E | 4/2003 | Hofmann et al. |
| 6,540,533 B1 | 4/2003 | Schreiber |
| 6,545,438 B1 | 4/2003 | Mays |
| 6,548,967 B1 | 4/2003 | Dowling et al. |
| 6,553,049 B1 | 4/2003 | Besaucele et al. |
| 6,555,935 B1 | 4/2003 | Maskovyak et al. |
| 6,559,625 B2 | 5/2003 | Freund et al. |
| 6,561,962 B1 | 5/2003 | Engelhart |
| 6,566,827 B2 | 5/2003 | Gotou et al. |
| 6,567,450 B2 | 5/2003 | Myers et al. |
| 6,570,353 B2 | 5/2003 | Krotsch et al. |
| 6,577,080 B2 | 6/2003 | Lys et al. |
| 6,579,137 B2 | 6/2003 | Mabru |
| 6,580,309 B2 | 6/2003 | Jacobs et al. |
| 6,581,559 B1 | 6/2003 | Grob et al. |
| 6,586,902 B2 | 7/2003 | Gotou et al. |
| 6,591,201 B1 | 7/2003 | Hyde et al. |
| 6,591,593 B1 | 7/2003 | Brandon et al. |
| 6,592,449 B2 | 7/2003 | Cipolla et al. |
| 6,595,897 B1 | 7/2003 | Dykstra et al. |
| 6,600,287 B2 | 7/2003 | Gotou |
| 6,604,497 B2 | 8/2003 | Buehrle et al. |
| 6,605,928 B2 | 8/2003 | Gupta et al. |
| 6,608,453 B2 | 8/2003 | Morgan et al. |
| 6,617,817 B2 | 9/2003 | Hill |
| 6,618,133 B2 | 9/2003 | Hedges et al. |
| 6,624,597 B2 | 9/2003 | Dowling et al. |
| 6,625,191 B2 | 9/2003 | Knowles et al. |
| 6,630,764 B1 | 10/2003 | Dube et al. |
| 6,630,901 B1 | 10/2003 | Winter et al. |
| 6,635,972 B1 | 10/2003 | Barthel et al. |
| 6,639,372 B2 | 10/2003 | Gotou |
| 6,641,245 B1 | 11/2003 | Kelly et al. |
| 6,646,401 B2 | 11/2003 | Jaenicke |
| 6,650,072 B2 | 11/2003 | Harlan |
| 6,654,548 B2 | 11/2003 | Schmitz |
| 6,664,749 B2 | 12/2003 | Heydt et al. |
| 6,665,976 B2 | 12/2003 | West |
| 6,667,869 B2 | 12/2003 | Greenberg |
| RE38,400 E | 1/2004 | Kowall et al. |
| 6,675,590 B2 | 1/2004 | Aarestrup |
| 6,680,593 B2 | 1/2004 | Gotou |
| 6,686,719 B2 | 2/2004 | Cochov et al. |
| 6,690,704 B2 | 2/2004 | Fallon et al. |
| 6,693,395 B2 | 2/2004 | Wilhelm |
| 6,693,851 B1 | 2/2004 | Fusjisawa et al. |
| 6,696,814 B2 | 2/2004 | Henderson et al. |
| 6,710,495 B2 | 3/2004 | Lipo et al. |
| 6,713,982 B2 | 3/2004 | Burse |
| 6,713,983 B2 | 3/2004 | Maruyama |
| 6,715,305 B2 | 4/2004 | Doi et al. |
| 6,717,376 B2 | 4/2004 | Lys et al. |
| 6,721,989 B1 | 4/2004 | Barlow |
| 6,724,122 B2 | 4/2004 | Frey et al. |
| 6,724,169 B2 | 4/2004 | Majumdar et al. |
| 6,724,376 B2 | 4/2004 | Sakura et al. |
| 6,724,692 B1 | 4/2004 | Akahane et al. |
| 6,726,698 B2 | 4/2004 | Cimino |
| 6,733,293 B2 | 5/2004 | Baker et al. |
| 6,752,226 B2 | 6/2004 | Naito et al. |
| 6,757,316 B2 | 6/2004 | Newman et al. |
| 6,770,186 B2 | 8/2004 | Rosenfeld et al. |
| 6,779,758 B2 | 8/2004 | Vu et al. |
| 6,781,335 B2 | 8/2004 | Osinga et al. |
| 6,786,625 B2 | 9/2004 | Wesson |
| 6,788,011 B2 | 9/2004 | Mueller et al. |
| 6,798,812 B2 | 9/2004 | Rylov et al. |
| 6,799,877 B2 | 10/2004 | Watkins et al. |
| 6,801,560 B2 | 10/2004 | Knowles et al. |
| 6,808,287 B2 | 10/2004 | Lebens et al. |
| 6,808,508 B1 | 10/2004 | Zafirelis et al. |
| 6,812,667 B2 | 11/2004 | Yasohara et al. |
| 6,814,172 B1 | 11/2004 | Vu |
| 6,819,303 B1 | 11/2004 | Berger et al. |
| 6,825,624 B2 | 11/2004 | Anwar et al. |
| 6,837,099 B2 | 1/2005 | Kim et al. |
| 6,838,841 B2 | 1/2005 | Kessler |
| 6,841,947 B2 | 1/2005 | Berg-johansen |
| 6,844,714 B2 | 1/2005 | Balmain et al. |
| 6,850,020 B1 | 2/2005 | Midas et al. |
| 6,850,029 B1 | 2/2005 | Pollock et al. |
| 6,850,468 B2 | 2/2005 | Fujisawa et al. |
| 6,856,638 B2 | 2/2005 | Aab et al. |
| 6,864,662 B2 | 3/2005 | Recker |
| 6,864,688 B2 | 3/2005 | Beutelschiess et al. |
| 6,865,458 B1 | 3/2005 | Kim |
| 6,876,104 B1 | 4/2005 | Guo |
| 6,876,105 B1 | 4/2005 | Faizullabhoy et al. |
| 6,882,674 B2 | 4/2005 | Wittak et al. |
| 6,888,280 B2 | 5/2005 | Dube et al. |
| 6,891,294 B1 | 5/2005 | Deal |
| 6,895,175 B2 | 5/2005 | Fulton et al. |
| 6,897,416 B2 | 5/2005 | Bohlender et al. |
| 6,900,604 B2 | 5/2005 | Kokami et al. |
| 6,900,605 B2 | 5/2005 | Nakaho |
| 6,906,482 B2 | 6/2005 | Shimizu et al. |
| 6,911,796 B2 | 6/2005 | Castro |
| 6,914,919 B2 | 7/2005 | Watson et al. |
| 6,917,178 B2 | 7/2005 | Takeuchi et al. |
| 6,917,502 B2 | 7/2005 | Enzinna et al. |
| 6,927,524 B2 | 8/2005 | Pyntikov et al. |
| 6,933,822 B2 | 8/2005 | Haugs et al. |
| 6,935,595 B2 | 8/2005 | Butsch et al. |
| 6,940,239 B2 | 9/2005 | Iwanaga et al. |
| 6,940,685 B2 | 9/2005 | Soldavini et al. |
| 6,941,793 B2 | 9/2005 | Rioux |
| 6,943,510 B2 | 9/2005 | Gorti |
| 6,950,272 B1 | 9/2005 | Rice et al. |
| 6,957,897 B1 | 10/2005 | Nelson et al. |
| 6,963,175 B2 | 11/2005 | Archenhold et al. |
| 6,965,205 B2 | 11/2005 | Piepgras et al. |
| 6,967,445 B1 | 11/2005 | Jewell et al. |
| 6,968,707 B2 | 11/2005 | Violand et al. |
| 6,975,079 B2 | 12/2005 | Lys et al. |
| 6,977,588 B2 | 12/2005 | Schotz et al. |
| 6,979,257 B2 | 12/2005 | Horner et al. |
| 6,979,967 B2 | 12/2005 | Ho |
| 6,987,787 B1 | 1/2006 | Mick |
| 6,988,820 B2 | 1/2006 | Drufva |
| 6,995,679 B2 | 2/2006 | Eskritt et al. |
| 7,005,646 B1 | 2/2006 | Jordanov et al. |
| 7,007,782 B2 | 3/2006 | Anwar et al. |
| 7,009,440 B2 | 3/2006 | Nogawa et al. |
| 7,009,653 B2 | 3/2006 | Yoo |
| 7,011,624 B2 | 3/2006 | Forsell |
| 7,012,396 B1 | 3/2006 | Brenden et al. |
| 7,014,336 B1 | 3/2006 | Ducharme et al. |
| 7,015,825 B2 | 3/2006 | Callahan |
| 7,034,899 B2 | 4/2006 | Symoen et al. |
| 7,038,399 B2 | 5/2006 | Lys et al. |
| 7,038,594 B2 | 5/2006 | Voreis et al. |
| 7,057,153 B2 | 6/2006 | Linge et al. |
| 7,058,107 B2 | 6/2006 | Knowles et al. |
| 7,064,503 B2 | 6/2006 | Marx et al. |
| 7,064,513 B2 | 6/2006 | Fenley |
| 7,065,435 B2 | 6/2006 | Gorman et al. |
| 7,071,894 B1 | 7/2006 | Thielemans et al. |
| 7,074,182 B2 | 7/2006 | Rovegno |
| 7,077,345 B2 | 7/2006 | Byram et al. |
| 7,088,063 B2 | 8/2006 | Kurosawa et al. |
| 7,091,874 B2 | 8/2006 | Smithson |
| 7,095,002 B2 | 8/2006 | Kong et al. |
| 7,095,128 B2 | 8/2006 | Canini et al. |
| 7,095,197 B2 | 8/2006 | Benchaib et al. |
| 7,095,679 B2 | 8/2006 | Fujisawa et al. |

(56) References Cited

U.S. PATENT DOCUMENTS

| | | | |
|---|---|---|---|
| 7,096,591 B2 | 8/2006 | Glantz et al. |
| 7,102,801 B2 | 9/2006 | Bliley et al. |
| 7,110,685 B2 | 9/2006 | Shin |
| 7,112,934 B2 | 9/2006 | Gilmore |
| 7,113,541 B1 | 9/2006 | Lys et al. |
| 7,116,075 B2 | 10/2006 | Gallagher et al. |
| 7,119,498 B2 | 10/2006 | Baldwin et al. |
| 7,123,211 B2 | 10/2006 | Nowatzyk |
| 7,123,458 B2 | 10/2006 | Mohr et al. |
| 7,124,691 B2 | 10/2006 | Donnelly et al. |
| 7,129,652 B2 | 10/2006 | Patel et al. |
| 7,129,668 B2 | 10/2006 | Kuribayashi et al. |
| 7,135,824 B2 | 11/2006 | Lys et al. |
| 7,144,383 B2 | 12/2006 | Arnett et al. |
| 7,145,298 B1 | 12/2006 | Garner |
| 7,145,302 B2 | 12/2006 | Sanglikar et al. |
| 7,145,834 B1 | 12/2006 | Jeter |
| 7,146,749 B2 | 12/2006 | Barron et al. |
| 7,154,239 B1 | 12/2006 | Chen et al. |
| 7,161,311 B2 | 1/2007 | Mueller et al. |
| 7,161,323 B2 | 1/2007 | Ajima et al. |
| 7,162,928 B2 | 1/2007 | Shank et al. |
| 7,164,364 B2 | 1/2007 | Losada |
| 7,180,252 B2 | 2/2007 | Lys et al. |
| 7,183,723 B2 | 2/2007 | Yu et al. |
| 7,186,000 B2 | 3/2007 | Lebens et al. |
| 7,193,377 B2 | 3/2007 | Fung |
| 7,193,379 B2 | 3/2007 | Beaudion et al. |
| 7,199,883 B1 | 4/2007 | Schaad |
| 7,200,327 B2 | 4/2007 | Pierron et al. |
| 7,218,010 B2 | 5/2007 | Albertson et al. |
| 7,218,661 B2 | 5/2007 | Knowles et al. |
| 7,221,121 B2 | 5/2007 | Skaug et al. |
| 7,233,123 B2 | 6/2007 | Koczara et al. |
| 7,234,312 B2 | 6/2007 | Violand et al. |
| 7,235,044 B2 | 6/2007 | Forsell |
| 7,235,936 B2 | 6/2007 | Oba et al. |
| 7,239,097 B2 | 7/2007 | Hashimoto |
| 7,244,106 B2 | 7/2007 | Kallman et al. |
| 7,250,733 B2 | 7/2007 | De Filippis et al. |
| 7,256,505 B2 | 8/2007 | Arms et al. |
| 7,256,727 B2 | 8/2007 | Fullerton et al. |
| 7,261,802 B2 | 8/2007 | Xu et al. |
| 7,262,574 B2 | 8/2007 | Koyanagi et al. |
| 7,263,953 B2 | 9/2007 | Sundararajan |
| 7,265,499 B2 | 9/2007 | Ball |
| 7,277,749 B2 | 10/2007 | Gordon et al. |
| 7,293,467 B2 | 11/2007 | Shank et al. |
| 7,294,982 B2 | 11/2007 | Kurosawa et al. |
| 7,296,913 B2 | 11/2007 | Catalano et al. |
| 7,298,101 B2 | 11/2007 | Watts et al. |
| 7,298,106 B2 | 11/2007 | Yamamoto et al. |
| 7,330,004 B2 | 2/2008 | DeJonge et al. |
| 7,332,881 B2 | 2/2008 | Clark et al. |
| 7,336,308 B2 | 2/2008 | Kubo |
| 7,339,344 B2 | 3/2008 | Borisavljevic |
| 7,351,954 B2 | 4/2008 | Zhang et al. |
| 7,352,339 B2 | 4/2008 | Morgan et al. |
| 7,373,529 B2 | 5/2008 | Nishida et al. |
| 7,391,180 B2 | 6/2008 | Armiroli et al. |
| 7,391,181 B2 | 6/2008 | Welchko et al. |
| 7,392,875 B2 * | 7/2008 | Matsuzaki | 180/247 |
| 7,412,835 B2 | 8/2008 | Legall et al. |
| 7,414,374 B2 | 8/2008 | Watts et al. |
| 7,414,862 B2 | 8/2008 | Park |
| 7,415,781 B2 | 8/2008 | Barron et al. |
| 7,416,032 B2 | 8/2008 | Money et al. |
| 7,420,351 B2 | 9/2008 | Grbovic |
| 7,427,845 B2 | 9/2008 | Burse |
| 7,430,936 B2 | 10/2008 | Petzold et al. |
| 7,436,148 B2 | 10/2008 | Saeki et al. |
| 7,449,860 B2 | 11/2008 | Sarlioglu et al. |
| 7,453,176 B2 | 11/2008 | Davison |
| 7,453,241 B2 | 11/2008 | Keiter et al. |
| 7,463,567 B2 | 12/2008 | Matsumoto |
| 7,467,830 B2 | 12/2008 | Donnelly |
| 7,471,055 B2 | 12/2008 | Atmur |
| 7,479,754 B2 | 1/2009 | Lucas et al. |
| 7,481,140 B2 | 1/2009 | Gass et al. |
| 7,482,767 B2 | 1/2009 | Tether |
| 7,482,768 B2 | 1/2009 | Lucas et al. |
| 7,485,979 B1 | 2/2009 | Staalesen |
| 7,486,488 B2 | 2/2009 | Wakatsuki et al. |
| 7,487,758 B1 | 2/2009 | Reid |
| 7,487,773 B2 | 2/2009 | Li |
| 7,488,079 B2 | 2/2009 | Hennes |
| 7,508,149 B2 | 3/2009 | Patel |
| 7,508,153 B2 | 3/2009 | Schanzenbach et al. |
| 7,509,945 B2 | 3/2009 | Teets et al. |
| 7,518,323 B2 | 4/2009 | Kuwada |
| 7,518,528 B2 | 4/2009 | Price et al. |
| 7,535,116 B2 | 5/2009 | Daigle et al. |
| 7,535,181 B2 | 5/2009 | Nicolai et al. |
| 7,535,187 B2 | 5/2009 | Carstensen |
| 7,598,683 B1 | 10/2009 | Jalbout et al. |
| 7,638,950 B1 | 12/2009 | Jalbout et al. |
| 2001/0010638 A1 | 8/2001 | Konna |
| 2001/0029422 A1 * | 10/2001 | Schmitt | 701/82 |
| 2003/0016198 A1 | 1/2003 | Nagai et al. |
| 2005/0052080 A1 * | 3/2005 | Maslov et al. | 307/10.1 |
| 2005/0116453 A1 | 6/2005 | Prinz et al. |
| 2007/0038340 A1 * | 2/2007 | Sekiguchi et al. | 701/22 |
| 2007/0187158 A1 | 8/2007 | Muta et al. |
| 2008/0264709 A1 | 10/2008 | Fenker et al. |
| 2008/0310194 A1 | 12/2008 | Huang et al. |
| 2009/0139782 A1 * | 6/2009 | Cull et al. | 180/65.8 |
| 2011/0017529 A1 * | 1/2011 | Durney | 180/65.1 |

FOREIGN PATENT DOCUMENTS

| | | |
|---|---|---|
| EP | 1905637 | 4/2008 |
| EP | 1982886 | 10/2008 |
| GB | 2178568 | 2/1987 |
| JP | H10-248112 | 9/1998 |
| JP | 2005184998 | 7/2005 |
| JP | 2007295671 | 11/2007 |
| JP | 2007296933 A * | 11/2007 |
| JP | 2009025140 | 2/2009 |
| WO | WO 02/29963 A2 | 4/2002 |

OTHER PUBLICATIONS

TMS320LF2407A Specifications.*
Machine Translation of JP 2005-184998 A.*
Machine Translation of JP 2009-025140 A.*
Machine Translation of JP 2007-296933 A.*
International Search Report and the Written Opinion from corresponding PCT/US2011/029170 dated Aug. 25, 2011.
International Search Report and the Written Opinion from corresponding PCT/US2010/053653 dated Nov. 7, 2012.
English Version of Office Action dated Jul. 22, 2013 from Corresponding Japanese Patent Application No. 2012536895.
Office Action cited in corresponding Chinese Application No. 201080049041.X dated Aug. 29, 2014.

* cited by examiner

TRACTION SYSTEM FOR ELECTRICALLY POWERED VEHICLES

BACKGROUND

Electric motors can exhibit a high torque output from very low revolutions per minute (RPM). Internal combustion engines, have very low torque at low RPMs, their torque increasing with increasing RPM to peak at a maximum, usually above 1000 RPM. However, the high torque of electrical motors cannot be utilised efficiently since the high torque will cause the driven wheel of the car to skid or slide. The maximum possible acceleration of a car on wheels is limited by the laws of physics, specifically, the coefficient of friction.

The coefficient of friction between two surfaces has two distinct parts: the coefficient of sliding friction (also known as just coefficient of friction), and the coefficient of starting friction (also known as the coefficient of static friction). For ease of discussion, the coefficient of sliding friction can be designated as $C_{slide}$ and the coefficient of starting friction as $C_{start}$. The coefficient of sliding friction, $C_{slide}$, defines the force required to keep an object sliding on a surface, specifically, $F=(W)X(C_{slide})$, where F is the force required to keep an object of weight W sliding on a surface which has a $C_{slide}$ (coefficient of sliding friction) for the two materials which compose the object and the surface on which it is sliding. $C_{slide}$ is dependent on the two materials and is independent of moderate speeds, although it usually decreases slightly above 30 to 40 feet per second. $C_{slide}$ is less than 1.0 and is always lower than $C_{start}$ for the same object on the same surface, i.e. for any given material on any given surface, $C_{start} > C_{slide}$.

The coefficient of starting friction, $C_{start}$, refers to the force required to cause an object at rest to begin sliding on a surface. The required force to start an object sliding is: $F=(C_{start})X(W)$. $C_{start}$ is greater than $C_{slide}$, so once the object begins to slide, it requires less force keep the object sliding.

The acceleration imparted on a car is limited by the coefficient of friction, i.e., A=F/M, where: A=acceleration, F=the force applied to the car, and M=the mass of the car. Since the force for acceleration F is limited by the coefficient of friction, thus the acceleration is limited by $C_{slide}$ and $C_{start}$.

A sliding wheel can impart a forward force on the car equal to the force due to the coefficient of sliding friction, i.e., $F=(W)X(C_{slide})$, where F is the imparted force of acceleration, Cslide is the coefficient of sliding friction between the tire of the driven wheel and the road, (which varies considerable with the type of road surface, and conditions such as temperature, wetness, etc.), and W is the combined total weight of the tire onto the road surface.

If the wheel is not skidding, then the forward force of acceleration can be as high as $F=(W)X(C_{start})$. Since Cstart>Cslide, the possible acceleration is greater as long as the wheel does not skid or slide. Thus the traction of a tire on the road is significantly higher when the surface of the tire is at rest relative to the surface of the road, as opposed to when the surface of the tire is sliding or skidding relative to the surface of the road. This does not mean that the tire is not moving; in fact, the tire may be travelling at a great speed, but if the tire is rotating at the correct rate, the bottom surface of the tire will match the speed at which the surface of the road meets the tire; that is, the tire is rolling on the road. All that matters is that the two surfaces of the tire and the road are momentarily at rest with respect to each other, where the two surfaces meet. The traction in that case is thus limited by Cstart.

If the two surfaces of the tire and road are moving relative to one another, then the traction is limited by $C_{slide}$. Since $C_{start} > C_{slide}$, the traction in the first case greatly exceeds the second case. It is exactly this principle which is the basis for many anti-lock braking systems ("ABS"), which lessen the braking action when wheel skid is detected, allowing the tire to freewheel, and to re-establish zero relative speed and thus provide conditions for $C_{start}$.

Previous traction techniques for vehicles having internal combustion engines or electric motors have been limited in ability to apply torque to drive wheels under various road conditions and with optimal energy efficiency.

SUMMARY

It is to be understood that both the foregoing summary of the present disclosure and the following detailed description are exemplary and explanatory and are not intended to limit the scope of the present disclosure. Moreover, with regard to terminology used herein, a reference to an element in the singular is not intended to mean "one and only one" unless specifically stated, but rather "one or more." The term "some" refers to one or more. Underlined and/or italicized headings and subheadings are used for convenience only, do not limit the present disclosure, and are not referred to in connection with the interpretation of the description of the present disclosure.

Aspects and embodiments of the of the present disclosure address problems previously for previous traction techniques for electrically powered vehicles and are directed to fixed frequency, fixed duration pulse streams used to control the power switch(es) for the electrical motor(s) of an electric car (or hybrid powered car). The advantages of such pulse-based techniques include increased power efficiency and system simplicity over analog systems. The capability of calibration with a single pulse allows such techniques to be used under any conditions, and also for real time adaptation to changes in road surface conditions and acceleration needs. These fixed frequency, fixed duration pulses techniques can provide much improved acceleration over other electrical systems, by making the best use of the coefficient of starting (or static) friction. Pulses of Fixed Frequency Fixed Duration (FFFD) can be superior to pulse width modulation (PWM) and variable frequency pulses in providing very accurate power pulses for precision control. FFFD pulses supply nearly exact packets of power with each pulse, thus allowing an exact measure of power to the wheels in nearly identical packets, and thereby making full use of the force to the wheel before it breaks from the Cstart condition. The systems and methods of the present disclosure can provide for a non-slip traction control. The use of an off state in the pulse stream is very superior to the use of ABS braking systems for the same purpose, which waste power and cause mechanical wear, since convention ABS makes use of braking forces rather than acceleration forces.

One skilled in the art will appreciate that embodiments and/or portions of embodiments of the present disclosure can be implemented in/with computer-readable storage media (e.g., hardware, software, firmware, or any combinations of such), and can be distributed over one or more networks. Steps described herein, including processing functions to derive, learn, or calculate formula and/or mathematical models utilized and/or produced by the embodiments of the present disclosure, can be processed by one or more suitable processors, e.g., central processing units ("CPUs), implementing suitable code/instructions in any suitable language (machine dependent on machine independent).

Additionally, embodiments of the present disclosure can be embodied in signals and/or carriers, e.g., control signals sent over a communications channel. Furthermore, software embodying methods, processes, and/or algorithms of the present disclosure can be implemented in or carried by electrical signals, e.g., for downloading from the Internet. While aspects of the present disclosure are described herein in connection with certain embodiments, it should be noted that variations can be made by one with skill in the applicable arts within the spirit of the present disclosure.

Other features of embodiments of the present disclosure will be apparent from the description, the drawings, and the claims herein.

BRIEF DESCRIPTION OF THE DRAWINGS

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

Figure 1A:
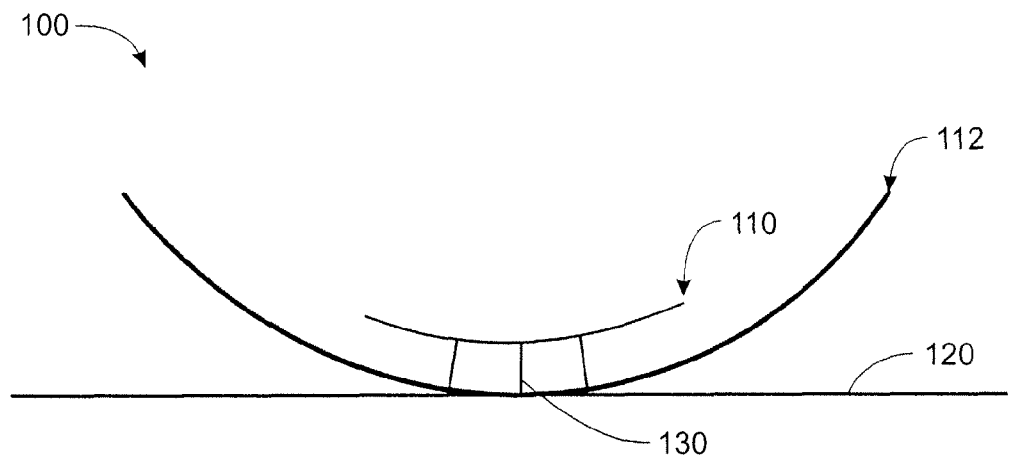
FIGS. 1A-1C depicts diagrammatic cross section views of a tire and wheel in different states of loading and slipping relative to an underlying surface.

While certain embodiments are depicted in the drawings, one skilled in the art will appreciate that the embodiments depicted are illustrative and that variations of those shown, as well as other embodiments described herein, may be envisioned and practiced within the scope of the present disclosure. Accordingly, the drawings and detailed description are to be regarded as illustrative in nature and not as restrictive.

DETAILED DESCRIPTION

In the following detailed description, numerous specific details are set forth to provide a full understanding of aspects and embodiments of the present disclosure. It will be apparent, however, to one ordinarily skilled in the art that aspects and embodiments of the present disclosure may be practiced without some of these specific details. In other instances, well-known structures and techniques have not been shown in detail to for ease in comprehension.

Embodiments of the present disclosure accommodate and take into account all of the variables in road/tire conditions, by taking measurement of the first pulse with wheel slip, and then providing fixed frequency, fixed duration pulse streams to control the power switch(es) for the electrical motor(s) of an electric car (or hybrid powered car). The resulting wheel rotation is continuously monitored, and upon any discrepancy from the expected pattern, a single pulse measurement is used to refresh the FFFD pulse stream with new timing values. Thus changes in road surface, tire loading from turning, or any other variations, are quickly and automatically compensated.

Figure 1B:
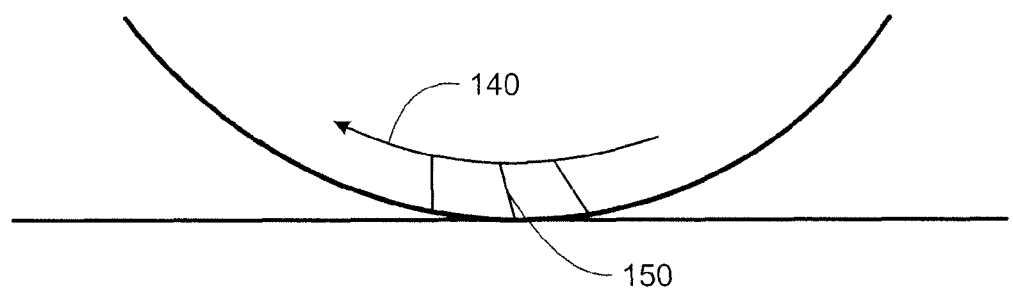
Figure 1C:
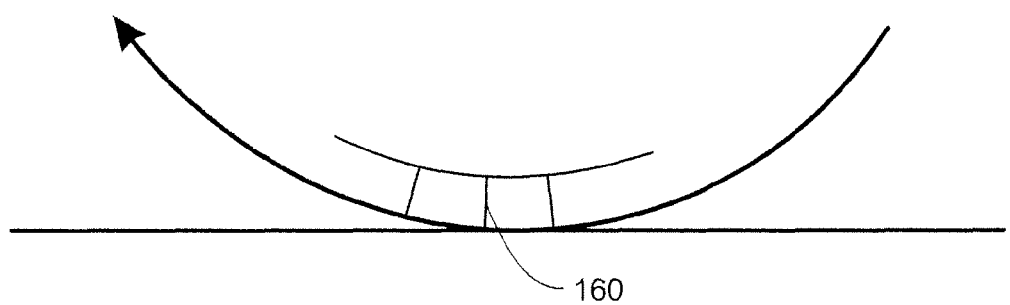

FIGS. 1A-1C depicts diagrammatic cross section views 100 of a tire and wheel in different states of loading and slipping relative to an underlying surface while FIGS. 2A-2D depicts four graphs of wheel and tire dynamics for different loading and spin conditions in accordance with the embodiments of the present disclosure: (A) Force v. Time, (B) Wheel RPM v. Time, (C) Applied Torque, and (D) Force v. Time.

FIGS. 1A-1C shows a wheel 110 and tire 112, at rest relative to a road, 120, and under different degrees of stress and loading (A)-(C). Since the tire is not moving relative to the road (note: these conditions apply even when the car is in motion, the wheels in freewheel mode) there is no forward stress on the tire, as shown by tire stress condition (or, strain) 130. As a large acceleration torque 140 is applied to the wheel, this causes the tire and related structure to be stressed, as shown by stress condition 150. Condition 160 shows that as the tire slips on the road, the stress (and strain) are partially relieved. By first approximation, the structure reacts as a spring, which means that the relationship between distortion and force is primarily linear in mathematical terms.

Figure 2A:
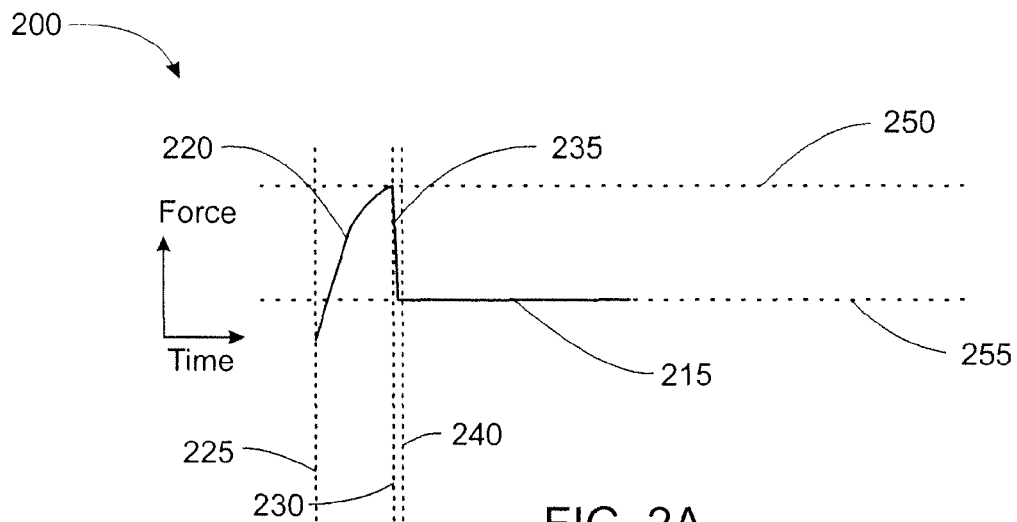
FIGS. 2A-2D depicts four graphs of wheel and tire dynamics for different loading and spin conditions in accordance with the embodiments of the present disclosure: (A) Force v. Time, (B) Wheel RPM v. Time, (C) Applied Torque, and (D) Force v. Time.
Figure 2B:
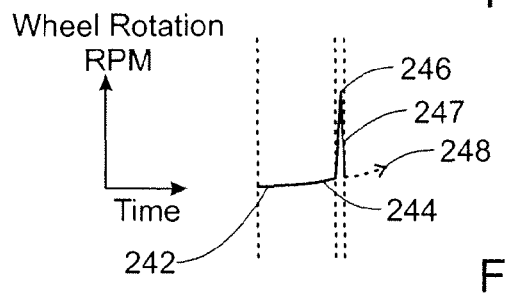
Figure 2C:
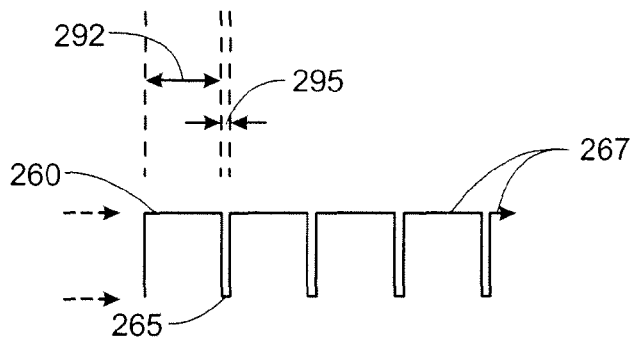

FIGS. 2A-2D depicts four graphs 200 of wheel and tire dynamics for different loading and spin conditions in accordance with the embodiments of the present disclosure: (A) Force v. Time, (B) Wheel RPM v. Time, (C) Applied Torque, and (D) Force v. Time. FIG. 2 illustrates the dynamics involved for a situation where a wheel and tire contacting an underlying surface such as pavement experience a condition where the available torque to turn this wheel is sufficiently high to overcome $C_{start}$. The force of acceleration on the car caused by this wheel is shown in FIG. 2A. The force 220, is shown increasing from zero (at time 225), linearly, as the torque is applied to the wheel; this would continue approximately linearly, except that the car would start to accelerate, as shown by the wheel rotation 242 and 244. This relieves the stress on the tire somewhat, and the curve 220 starts to flatten out. However, since the available torque from the electrical motor is greater than that allowed by $C_{start}$, 250, when inevitably curve 220 reaches the value 250, the wheel will start to slide, or skid, at time 230, with the tire rotation increasing very quickly, 246, instead of increasing as expected 248.

The skid or slide means that the friction between the tire and the road is determined by $C_{slide}$, and as seen by the curve 235, the acceleration force falls to level 255 fairly quickly. So long as the wheel is skidding (or spinning), the maximum traction possible is level 255, as indicated by 215. However, by turning OFF the torque as soon as wheel spin is detected, the wheel recovers to its non stressed state just as quickly, 247. The end of recovery 247 is used to mark time 240, which defines the end of time period 295, the recovery time. It is important to note that the values for $C_{start}$, $C_{slide}$, and thus the shapes of the curves, and thus the times 230 and 240, all vary with changing conditions such as wetness, temperatures of the road and tire, type of road surface, etc. The values of $C_{start}$, $C_{slide}$, can also change with weight loading of the car on that tire, air resistance on the car and tire, and even if the wheel has lateral (turning, or side-loading) forces at the same time. What is also important is that under all these variations, $C_{start}$ is always higher that $C_{slide}$, so that the general principles hold true.

As noted previously, embodiments of the present disclosure can accommodate and take into account all of the variables in road/tire conditions, by taking measurement of the first pulse with wheel slip, i.e., monitoring and recording the time duration 292 and 295. Pulses to be used in subsequent acceleration of this wheel are the repeated, for a given or specified time domain (or period of time), by using the time (pulse widths) 295 and 292 to generate the pulse train shown by maximum torque applied ON for a period of time 260, and the torque OFF for a period 265, repeating, 267, as long as the driver keeps indicating a desired increase in speed or until an intervening condition or command occurs, e.g., wheel slip or braking occurs.

As a result, an acceleration force is supplied to the wheel and tire, as shown by curve 290. Note that the average of this acceleration force is at level 275, which is lower than the absolute maximum level 280, but higher than the spinning wheel level 270.

With reference again to FIGS. 1A-1C, it may be noted that the unstressed state, 130, does not depend on the car to be stopped, only that the tire is at rest relative to the road; i.e. the car can be in motion at any speed. Thus as long as the torque OFF period 265 of FIG. 2 is sufficiently long to allow the curve 290 to fall momentarily below the Cslide level 270, and establish zero relative speed between tire and road surfaces, then the initial condition 130 of FIG. 1 is re-established. It should be noted that the recovery time need not be exactly the period T2, 295. It is not necessary for the torque force to fall to zero; only that it fall below Cslide, 255, which re-establishes the zero slip condition. T2, 295 can be used in the system software for recovery, or a slightly higher or lower time period allotted for recovery, in order to customize performance "feel".

Figure 4:
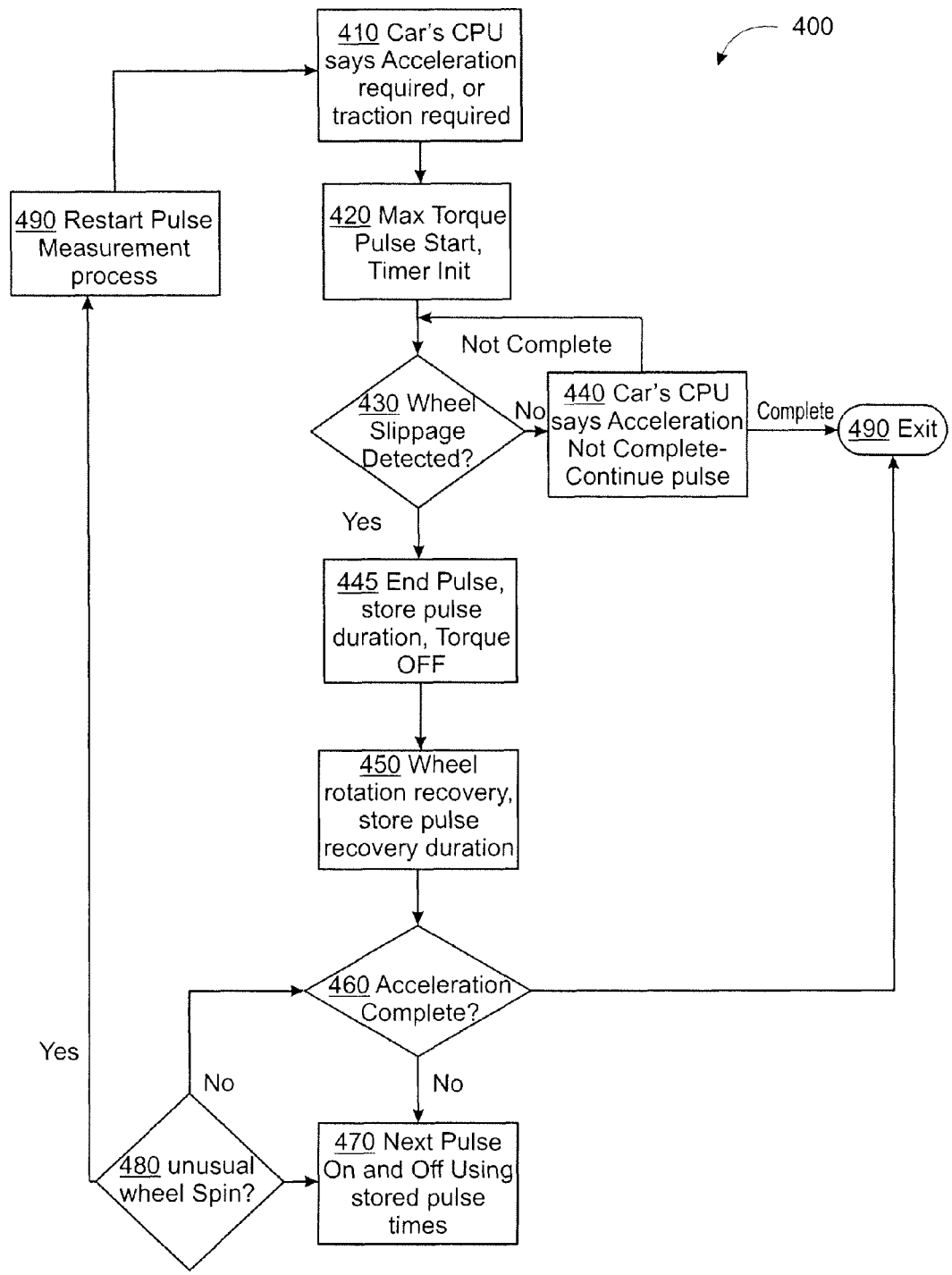
FIG. 4 depicts an exemplary algorithm or flow chart for establishing a fixed-frequency fixed-duration pulse stream for controlling power to an electrical engine supplying power to one or more wheels.

By using the first pulse to determine the period lengths of T1 292 and T2 295, all variations in the ambient conditions are accompanied. Once T1 292 and T2 295 are established, the pulse train 267 is of Fixed Frequency and Fixed Duration. The system is responsive in real time. The wheel rotation can monitored at desired times or continuously, (e.g., as shown in FIG. 4 at 480 and FIG. 5 at 575) and if the wheel slip is longer than the recovery time 295, or if it is absent completely, then the system reinitializes in the very next pulse. This can be done since only one pulse is required to reset the pulse timing for changing road conditions or change in system performance (lower available engine torque, shift in weight distribution, etc.) as the car increases speed.

Figure 2D:
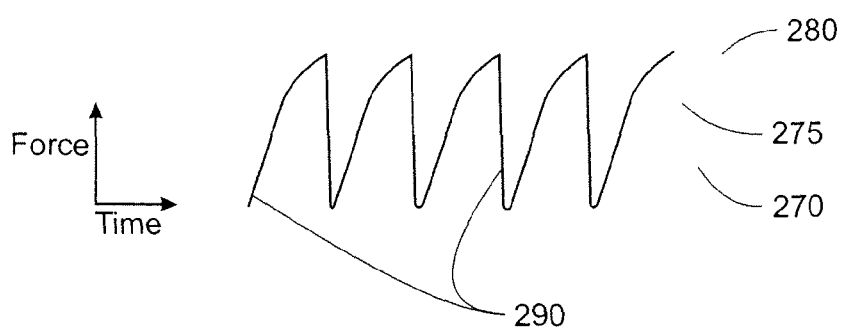

While the average acceleration 275 shown in FIG. 2D is less than the theoretical maximum of 280, the approach of using pulsed power according to the present disclosure has several practical advantages relative to previous approaches. For example, pulses systems according to the present disclosure can automatically compensate for varying $C_{start}$ and $C_{slide}$ values by measuring the first pulse upon a required acceleration; analog systems must somehow determine these values accurately and quickly. Electronic analog power control systems are less efficient than pulse systems in power efficiency, a critical factor when electric cars are limited by battery capacity. Additionally, analog power control systems are more complex in design and manufacture.

As well, pulsed systems and methods according to the present disclosure can be self correcting. When the car is moving at a high speed and the electrical motor is operating at higher RPMs and the torque capability is no longer greater than Cstart imposes, then the curve 220 flattens considerably more, and never crosses the Cstart level 250. Thus there is no end to the initial pulse, and the maximum available power from the electrical motor is kept in the ON state for the duration. Note that this maximum acceleration system is imposed only when the car's computer detects a requirement for fast acceleration i.e. heavy throttle setting; however, the same system can be activated by the car's computer to insure that there is minimal wheel slippage, thus providing an active, pulsed traction control system.

For certain situations maximum acceleration force is required. For example, a situation in which a four-wheel drive (4WD) wheel drive vehicle must be moved out of a mired condition, it is greatly desirable to have the maximum forward force applied to the vehicle. For a 4WD vehicle, it is preferable that all four wheels accelerate in unison; not just nearly in unison, but exactly in unison. If, for example, four persons are attempting to push a car out of a snowbank, then all four persons ideally would apply their shove synchronously, so as to maximize the impulse on the stuck vehicle; if one person is out of synch with the others, then his or her impulse is not added to the peak impulse of the other three persons, and the maximum peak forward force is not realized.

Figure 3A:
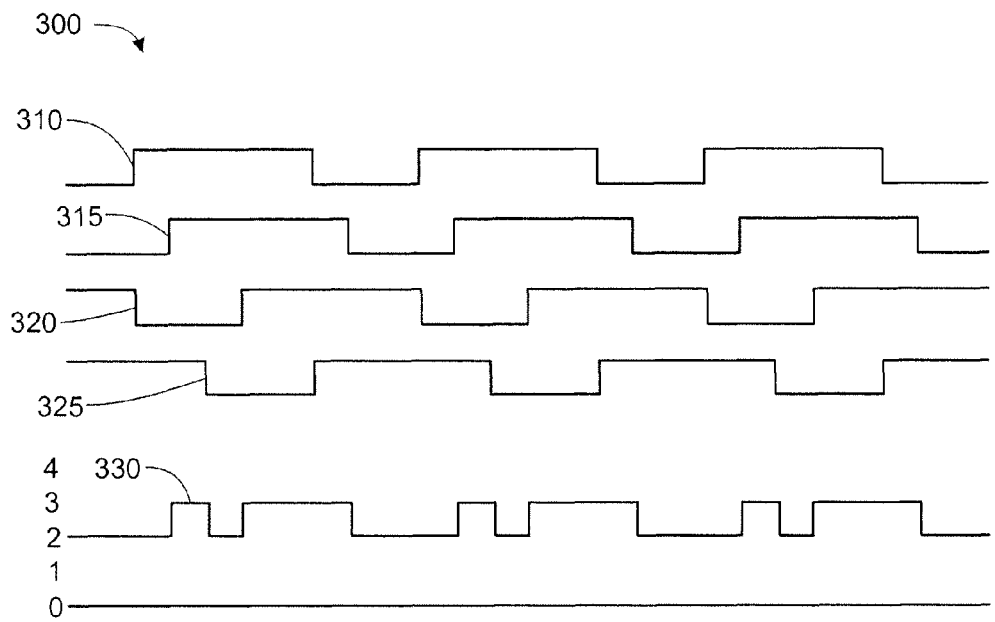
FIGS. 3A and 3B depicts two sets of plots (A)-(B) illustrating how embodiments of the present disclosure can provide the maximum impulse force in acceleration by synchronizing the torque ON pulses to four wheels of a vehicle.
Figure 3B:
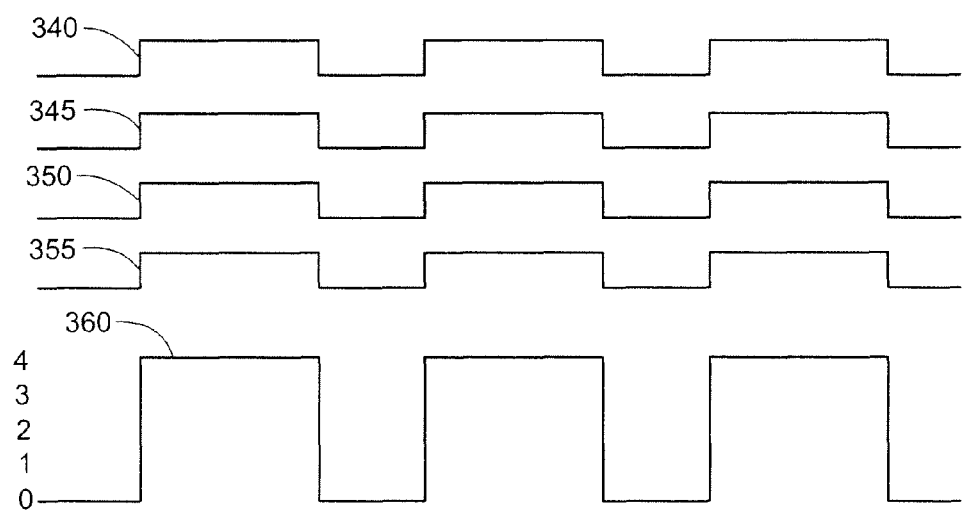

FIGS. 3A and 3B depicts two sets of plots (A)-(B) illustrating how embodiments of the present disclosure can provide the maximum impulse force in acceleration by synchronizing the torque ON pulses to four wheels of a vehicle.

FIGS. 3A and 3B shows how a method embodiment 300 of the present disclosure can be used to provide the maximum impulse force in acceleration by synchronizing the torque ON pulses to all four wheels. 310, 315, 320, and 325 represent the torque On/Off states for four wheels which are not time synchronized. The resulting total torque for the four wheels is represented by 330. 330 shows that the maximum total force is, in this example, 3. In contrast, 340, 345, 350, and 355 show four similar wheels with similar torque duty cycles, which are time synchronized. The total force 360 reaches a value of 4 on each pulse cycle. By utilizing the same Fixed Frequency/Fixed Duration pulses at each of the four wheels synchronously, the maximum forward force possible is imparted to the car.

FIG. 4 depicts an exemplary algorithm 400 or flow chart for establishing a fixed-frequency fixed-duration pulse stream for controlling power to an electrical engine supplying power to one or more wheels.

FIG. 4 shows a typical subroutine logic to establish the fixed frequency/fixed duration pulse stream which controls the power to the electrical engine. When the requirement for additional acceleration is received from the car's on board computer, the system initializes, 410. The data for the wheel rotational rate noted, and the system initiates with the calibrating ON pulse, 420. The timer is started to measure the pulse length initiated by 420. The wheel rotation is monitored for slippage, 430, and if none is detected, the pulse continues in the ON mode; the requirement for additional acceleration is continuously monitored as well, by 440, "not complete". This loop 430, 440, can continue until wheel slippage or the requirement for acceleration is completed or no longer needed.

If there is a wheel slippage detected, then the ON pulse can be terminated, 445, and the length of the pulse (T2, FIG. 2, 292) is stored and the Off state sent to the engine power control. The wheel slippage is monitored for recovery to non-slip condition, and the elapsed recovery time (FIG. 2, 295) is stored, 450. The system then generates the string of fixed frequency/fixed duration pulse in loop 460, 470, 480, until the acceleration requirement if fulfilled as per the car's computer, or an unusual slippage condition (too long, or completely absent) is detected, at which time the system reinitializes, 490. When there is no wheel slippage, this system maintains the constant On power state when maximum acceleration is required, and when the conditions of the wheel rotation change, the system reinitializes and recalibrates within a single pulse. The onboard computer of the vehicle can initiate this system at any time without requiring acceleration, just to keep the wheels in the non-slip condition, i.e., an active traction control, non skid system, FIG. 4 input to 410, 440, under car's CPU control.

Figure 5:
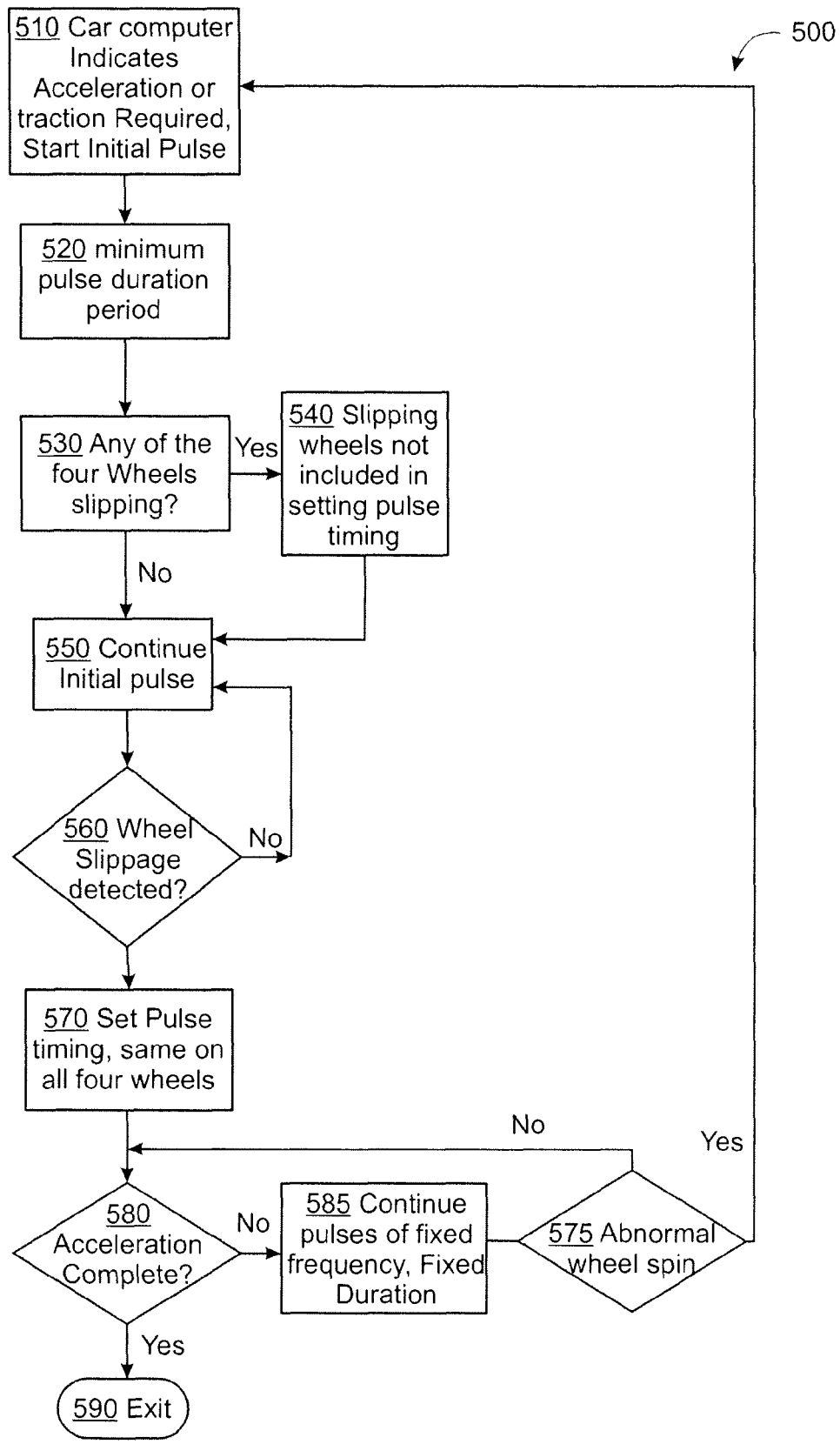
FIG. 5 depicts an exemplary algorithm or flow chart for supplying power with fixed-frequency fixed-duration pulse streams for four-wheel drive vehicles.

FIG. 5 depicts an exemplary algorithm 500 or flow chart for supplying power with fixed-frequency fixed-duration pulse streams for four-wheel drive vehicles, such as shown to be required in FIGS. 3A and 3B. While not show, a variation for 2 wheel drive vehicles can be derived, and is not discussed. Also, all principles from FIG. 4 are assumed for FIG. 5, but for simplicity, not shown. FIG. 5, 510 shows the car's CPU requesting maximum acceleration. As previously mentioned, the car's CPU can simply poke this system in a non-acceleration way, to change from a maximum acceleration system to a traction control system. Since any one or more of the wheels may be on a very poor traction state, eg wet ice, where Cstart is very low, a minimum pulse duration period is established, in the order of 15 milliseconds, 520. This minimum pulse can be adjusted in software to accommodate various car configurations or "performance feel". After the minimum pulse period, if any of the wheels are slipping, 530, they are not used to determine the pulse ON length, 540. The CPU processor executes its instructions in microseconds, whereas the wheel rotation and slippage detection is in the millisecond range, thus the digital processing of the data and software are inconsequential to the mechanics of the system.

Subsequently, 550 and 560 determine the fixed frequency, fixed duration pulse lengths for the wheels with significant traction, 570 uses this pulse stream to drive all four wheels simultaneously; even if one or more wheel may be slipping, once the car moves ever so slightly, the slipping wheels may gain traction, It is important to maintain synchronicity to achieve maximum forward impulse force. Loop 580, 585, 575, and 590 continue the system logic until the acceleration requirement is removed (i.e., the car moves or the driver throttles back).

It will be understood that algorithm 500 can be stored in any suitable computer readable medium, e.g., flash memory, ROM, EEPROM, RAM, hard discs, etc., and may be coded in any suitable language (machine dependent or machine independent). Moreover, such an algorithm may be a functional component of suitable software and can be stored in firmware and/or hardware. Additionally, such an algorithm or software can be run or performed by any suitable processor.

Figure 6:
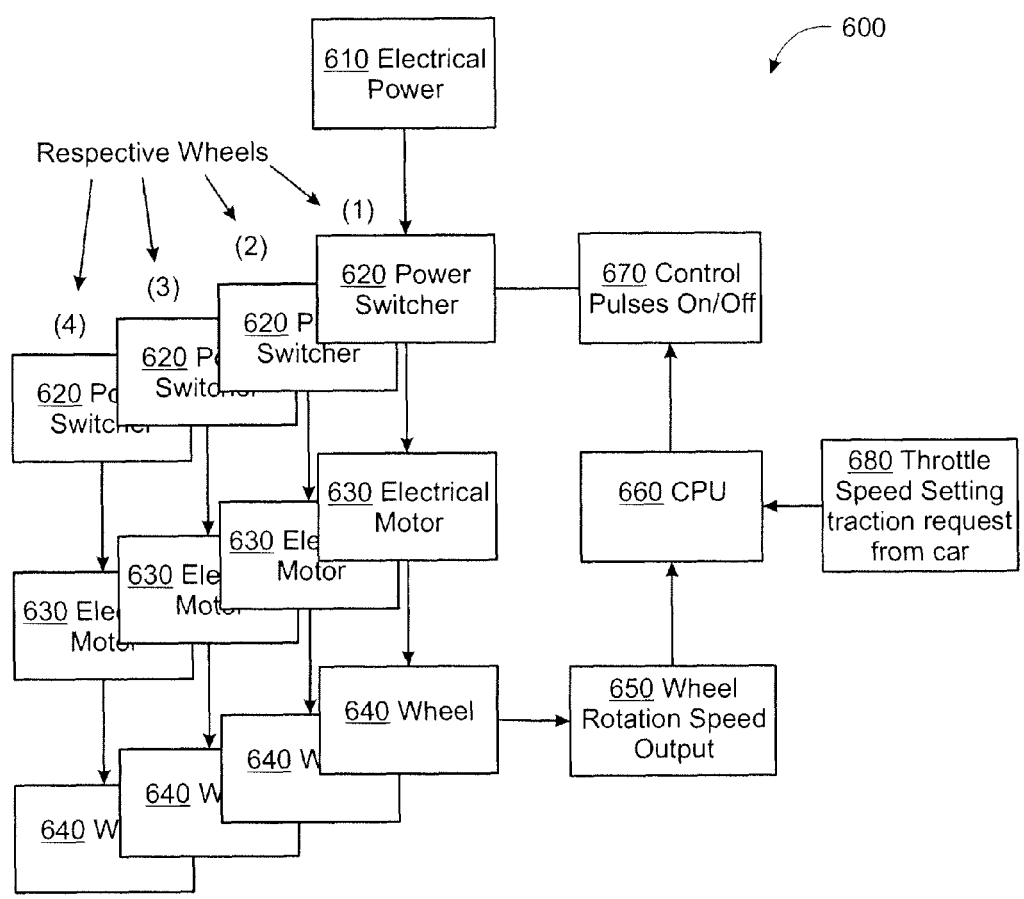
FIG. 6 depicts a box diagram of an exemplary system, in accordance with embodiments of the present disclosure.

FIG. 6 depicts a box diagram of an exemplary system 600, in accordance with embodiments of the present disclosure. The power can be electrical, and can either AC or DC, 610. This power can be switchable ON and OFF, 620, and this on/off state should be controllable by an outside signal, 670. The switched power can run an electrical motor 630, which in turn drives the cars wheel(s), 640. The rotation of the wheels should be monitored by servo or other methods, with sufficient resolution for our purposes, 650. The system CPU, 660, can receive commands from the car's CPU, 680 for throttle setting and traction control mode. The CPU can utilize these inputs 680, 650, to generate the pulse control signals, 670 which in turn can switch the Motor power on and off, 620. Variations of this configuration are possible, including the incorporation of hybrid power (gasoline assisted) systems, which will be automatically compensated by the first pulse calibration method of this present disclosure under all conditions. Moreover, one electric motor can supply power to an axle, with or without a differential mechanism. For exemplary embodiments, a separate electric motor is provided to drive each wheel of the vehicle.

FIG. 6 also shows additional respective power switches 620 and electric motors 630 for additional wheels (2)-(4) of a representative vehicles. For such applications, the related sensing system would detect the wheel motion of those additional wheels and the controller or additional controllers would control the torque and power supplied to the additional wheel by supplying a fixed duration fixed frequency control signal as described previously.

While some specific descriptions of aspects and embodiments of the present disclosure have been provided, there may be many other ways to implement various aspects and embodiments of the present disclosure. Various functions and elements described herein may be partitioned differently from those shown without departing from the spirit and scope of the present disclosure. Various modifications to these embodiments will be readily apparent to those skilled in the art, and generic principles defined herein may be applied to other embodiments. Thus, many changes and modifications may be made, by one having ordinary skill in the art, without departing from the spirit and scope of the present disclosure and claimed embodiments.

What is claimed is:

1. A system for controlling power applied to one or more drive wheels of a vehicle, the system comprising:
   an electric motor configured and arranged to supply power for driving a wheel;
   the wheel configured and arranged to receive power from the electric motor;
   a controller operative to (i) receive acceleration commands and wheel slip information for the wheel as inputs, wherein the wheel slip information comprises a measurement of a time from an application of a maximum torque until slippage of the wheel starts, and (ii) produce as an output a control signal for the electric motor driving the wheel, wherein the control signal includes a timing cycle with a series of pulses having fixed frequency and fixed duration within the timing cycle to cause current to flow to the electric motor during an ON state of the timing cycle, wherein a first pulse of the series of pulses with wheel slip is measured by monitoring and recording a first time duration of the first pulse comprising the time from the application of the maximum torque until slippage of the wheel starts and a second recovery time duration of the first pulse, and using the first and second recovery time durations to generate subsequent pulses of the series of pulses in the timing cycle; and
   a current switch connected to the electric motor including an input to receive the control signal to place the switch in one of the ON state and an OFF state according to the timing cycle.

2. The system of claim 1, wherein the controller is configured and arranged to adjust the timing cycle of the pulses of fixed frequency and fixed duration.

3. The system of claim 2, wherein the controller is configured and arranged to adjust the timing cycle based on a sensed coefficient of friction of the wheel.

4. The system of claim 1, wherein the controller is configured and arranged to provide real-time adjustment of the power supplied to the wheel, wherein changing traction conditions can be accommodated.

5. The system of claim 1, wherein the system is configured and arranged for automatic measurement, storage, and use of a pulse length for the first time duration.

6. The system of claim 1, wherein the system is configured and arranged for automatic measurement, storage, and use of a pulse length for the second recovery time furation.

7. The system of claim 1, wherein the wheel slip information comprises a coefficient of starting friction or a coefficient of sliding friction.

8. The system of claim 1, further comprising a second electric motor, a second wheel, and a second current switch, wherein the controller is configured and arranged to (i) receive acceleration commands and wheel slip information for the second wheel as inputs, and (ii) produce as an output a control signal for the second electric motor driving the second wheel, wherein the control signal includes a timing cycle with a series of pulses of fixed frequency and fixed duration within the timing cycle to cause current to flow to the second electric motor during the ON state of the timing cycle, and wherein the second current switch is connected to the second electric motor and includes an input to receive the control signal to place the second current switch in one of the ON state and the OFF state according to the timing cycle.

9. The system of claim 8, wherein the controller is configured and arranged to detect which wheels have a minimum acceptable traction for inclusion in a synchronized power pulse provided to the wheels.

10. The system of claim 9, wherein the detection of the minimum acceptable traction is based on a minimum time before a slide starts to occur.

11. The system of claim 10, wherein the minimum time is 15 milliseconds.

12. The system of claim 8, further comprising a third electric motor, a third wheel, and a third current switch, wherein the controller is configured and arranged to (i) receive acceleration commands and wheel slip information for the third wheel as inputs, and (ii) produce as an output a control signal for the third electric motor driving the third wheel, wherein the control signal includes a timing cycle with a series of pulses of fixed frequency and fixed duration within the timing cycle to cause current to flow to the third electric motor during the ON state of the timing cycle, and wherein the third current switch is connected to the third electric motor and includes an input to receive the control signal to place the third current switch in one of the ON state and the OFF state according to the timing cycle.

13. The system of claim 12, further comprising a fourth electric motor, a fourth wheel, and a fourth current switch, wherein the controller is configured and arranged to (i) receive acceleration commands and wheel slip information for the fourth wheel as inputs, and (ii) produce as an output a control signal for the fourth electric motor driving the fourth wheel, wherein the control signal includes a timing cycle with a series of pulses of fixed frequency and fixed duration within the timing cycle to cause current to flow to the fourth electric motor during the ON state of the timing cycle, and wherein the fourth current switch is connected to the fourth electric motor and includes an input to receive the control signal to place the fourth current switch in one of the ON state and the OFF state according to the timing cycle.

14. The system of claim 13, wherein the controller is configured and arranged to provide synchronization of the series of pulses provided to the four electric motors for synchronized four-wheel drive operation.

15. The system of claim 13, wherein the controller is configured and arranged to detect which wheels have a minimum acceptable traction for inclusion in a synchronized power pulse provided to the wheels.

16. The system of claim 15, wherein the detection of the minimum acceptable traction is based on a minimum time before a slide starts to occur.

17. The system of claim 16, wherein the minimum time is 15 milliseconds.

18. The system of claim 1, wherein the duration of each pulse of the control signal is equal to a period of time between pulses in the timing cycle.

19. The system of claim 1, wherein the duration of each pulse of the control signal is less than or equal to a period of time between pulses in the timing cycle.

20. The system of claim 1, wherein the number of pulses in the timing cycle varies from zero to a maximum number corresponding to an acceleration level of the electric motor from zero to a maximum acceleration level.

21. The system of claim 1, further comprising a processing system to generate the control signal supplied to the current switch and to time the start and end of each of the series of pulses within the timing cycle.

22. The system of claim 1, wherein a length of the timing cycle is constant and an acceleration of the vehicle is varied by changing the number of pulses from the timing cycle to another timing cycle.

23. The system of claim 1, wherein the wheel slip information comprises a coefficient of starting friction and a coefficient of sliding friction.

24. A method for controlling the power applied to one or more electric motors coupled to one or more wheels of an electrically powered vehicle, the method comprising:
providing a timing cycle;
determining a desired acceleration rate for a vehicle powered by one or more electrically driven wheels;
based on receiving acceleration commands and wheel slip information for the one or more wheels, wherein the wheel slip information comprises a measurement of a time from an application of a maximum torque until slippage of one of the wheels starts, generating a control signal for each of the one or more wheels including a series of pulses having fixed frequency and fixed duration within the timing cycle corresponding to the desired acceleration rate, wherein a first pulse of the series of the pules with wheel slip is measured by monitoring and recording a first time duration of the first pulse comprising the time from the application of the maximum torque until slippage of one of the wheels starts and a second recovery time duration of the first pulse, and using the first and second recovery time durations to generate subsequent pulses of the series of pulses in the timing cycle; and
supplying the control signal to a respective input of each of one or more current switches, each current switch being connected to an electric motor, each electric motor being connected to a respective one of the wheels, to place the respective switch in one of an ON state during each of the series of pulses and an OFF state after each of the series of pulses to cause current to flow to the respective electric motor connected to each electrically driven wheel during the ON state and cause the respective electric motor to supply a desired power to each electrically driven wheel over the timing cycle.

25. The method of claim 24, wherein the one or more electrically driven wheels comprises two wheels.

26. The method of claim 25 wherein the duration of each pulse of the control signal is equal to a period of time between pulses in the timing cycle.

27. The method of claim 25 wherein the duration of each pulse of the control signal is less than or equal to a period of time between pulses in the timing cycle.

28. The method of claim 25 wherein the number of pulses in the timing cycle varies from zero to a maximum number corresponding to a power level of an electric motor from zero to a maximum power level.

29. The method of claim 24, wherein the one or more electrically driven wheels comprises four wheels.

30. The method of claim 24, wherein providing the timing cycle includes establishing a timing cycle of a constant length and the power applied to each wheel is varied by changing the number of generated pulses from one timing cycle to another timing cycle.

31. The method of claim 24, further comprising adjusting the timing cycle of the pulses of fixed frequency and fixed duration.

32. The method of claim 31, wherein adjusting the timing cycle is based on a sensed coefficient of friction of the driven wheel.

33. The method of claim 32, wherein adjusting the timing cycle comprises real-time adjustment, wherein changing traction conditions can be accommodated.

34. The method of claim 24, further comprising automatic measurement, storage, and use of a pulse length for the first duration.

35. The method of claim 24, further comprising automatic measurement, storage, and use of a pulse length for the second recovery time duration.

36. The method of claim 24, further comprising sensing wheel slip information, wherein the wheel slip information comprises a coefficient of starting friction or a coefficient of sliding friction.

37. The method of claim 24, wherein supplying the control signal comprises providing synchronization of pulses provided to two or more electric motors for synchronized two-wheel drive or four-wheel drive operation.

38. The method of claim 24, further comprising detecting which of the wheels have a minimum acceptable traction for inclusion in a synchronized power pulse provided to the wheels.

39. The method of claim 38, wherein detecting the minimum acceptable traction is based on a minimum time before a slide starts to occur.

40. The method of claim 39, wherein the minimum time is 15 milliseconds.

41. The method of claim 24, further comprising sensing the wheel slip information, wherein the wheel slip information comprises a coefficient of starting friction and a coefficient of sliding friction.

42. A computer program product residing on a non-transitory computer-readable storage medium having a plurality of instructions stored thereon, which when executed by a processing system, cause the processing system to:
provide a timing cycle;
determine a desired acceleration rate for a vehicle powered by one or more electrically driven wheels;
based on acceleration commands and wheel slip information for the one or more wheels, wherein the wheel slip information comprises a measurement of a time from an application of a maximum torque until slippage of one of the wheels starts, generate a control signal for each of the one or more wheels including a series of pulses having fixed frequency and fixed duration within the timing cycle corresponding to the desired acceleration rate, wherein a first pulse of the series of pulses with wheel slip is measured by monitoring and recording a first time duration of the first pulse comprising the time from the application of the maximum torque until slippage of one of the wheels starts and a second recovery time duration of the first pulse, and using the first and second recovery time durations to generate subsequent pulses in the timing cycle; and
supply the control signal to a respective input of one or more current switches, each current switch being connected to an electric motor, each electric motor being connected to a respective one of the wheels, to place the respective switch in one of an ON state during each pulse of the series of pulses and an OFF state after each pulse to cause of the series of pulses current to flow to the respective electric motor connected to each electrically driven wheel during the ON state and cause the respective electric motor to supply a desired power to each electrically driven wheel over the timing cycle.

43. The computer program product of claim 42, wherein the computer-readable storage medium comprises flash memory.

44. The computer program product of claim 42, wherein the computer-readable storage medium comprises ROM memory.

45. The computer program product of claim 42, wherein the one or more electrically driven wheels comprises two wheels.

46. The computer program product of claim 42, wherein the one or more electrically driven wheels comprises four wheels.

47. The computer program product of claim 42, wherein providing the timing cycle includes establishing a timing cycle of a constant length and the power applied to each wheel is varied by changing the number of generated pulses from the timing cycle to another timing cycle.

48. The computer program product of claim 42, wherein the duration of each pulse of the control signal is equal to a period of time between pulses in the timing cycle.

49. The computer program product of claim 42, wherein the duration of each pulse of the control signal is less than or equal to a period of time between pulses in the timing cycle.

50. The computer program product of claim 42, wherein the number of pulses in the timing cycle varies from zero to a maximum number corresponding to a power level of an electric motor from zero to a maximum power level.

51. The computer program product of claim 42, further comprising an instruction to adjust the timing cycle of the pulses of fixed frequency and fixed duration.

52. The computer program product of claim 42, further comprising an instruction to adjust the timing cycle based on a sensed coefficient of friction of the driving wheel.

53. The computer program product of claim 42, further comprising an instruction to adjust the timing cycle for real-time adjustment, wherein changing traction conditions can be accommodated.

54. The computer program product of claim 42, further comprising an instruction for automatic measurement, storage, and use of a pulse length for the first time duration.

55. The computer program product of claim 42, further comprising an instruction for automatic measurement, storage, and use of a pulse length for the second recovery time duration.

56. The computer program product of claim 42, wherein the wheel slip information comprises a coefficient of starting friction or a coefficient of sliding friction.

57. The computer program product of claim 42, further comprising an instruction for providing synchronization of pulses provided to two or more of the electric motors for synchronized two-wheel drive or four-wheel drive operation.

58. The computer program product of claim 42, further comprising an instruction for detecting which of the wheels have a minimum acceptable traction for inclusion in a synchronized power pulse provided to the wheels.

59. The computer program product of claim 58, wherein detecting the minimum acceptable traction is based on a minimum time before a slide starts to occur.

60. The computer program product of claim 59, wherein the minimum time is 15 milliseconds.

61. The computer program product of claim 42, wherein the wheel slip information comprises a coefficient of starting friction and a coefficient of sliding friction.

\* \* \* \* \*